United States Patent
Ma et al.

(10) Patent No.: US 7,668,269 B2
(45) Date of Patent: Feb. 23, 2010

(54) SYSTEMS, METHODS, AND APPARATUS FOR PHASE NOISE MITIGATION

(75) Inventors: Xiaoqiang Ma, Newtown, PA (US); Azzedine Touzni, Doylestown, PA (US)

(73) Assignee: ATI Technologies, Inc., Markham (CA)

( * ) Notice: Subject to any disclaimer, the term of this patent is extended or adjusted under 35 U.S.C. 154(b) by 729 days.

(21) Appl. No.: 11/124,131

(22) Filed: May 9, 2005

(65) Prior Publication Data
US 2006/0251198 A1 Nov. 9, 2006

(51) Int. Cl.
H04B 1/10 (2006.01)
(52) U.S. Cl. .................... 375/350; 375/340
(58) Field of Classification Search ......... 375/229–236, 375/340, 350
See application file for complete search history.

(56) References Cited

U.S. PATENT DOCUMENTS

| | | | |
|---|---|---|---|
| 5,987,063 A | 11/1999 | Rinne | |
| 6,141,378 A * | 10/2000 | d'Oreye de Lantremange | 375/232 |
| 6,304,545 B1 | 10/2001 | Armbruster | |
| 7,136,410 B2 * | 11/2006 | Choi et al. | 375/148 |
| 7,266,145 B2 * | 9/2007 | Balasubramonian et al. | 375/232 |
| 2002/0034213 A1 | 3/2002 | Wang | |
| 2002/0044524 A1 * | 4/2002 | Laroia et al. | 370/203 |
| 2002/0146063 A1 * | 10/2002 | Gorokhov et al. | 375/148 |
| 2002/0181549 A1 * | 12/2002 | Linnartz et al. | 375/142 |
| 2002/0191630 A1 * | 12/2002 | Jacobsen | 370/430 |
| 2003/0021332 A1 * | 1/2003 | Li | 375/147 |
| 2003/0108127 A1 | 6/2003 | Eilts | |
| 2003/0215007 A1 * | 11/2003 | Mottier | 375/229 |
| 2004/0005010 A1 * | 1/2004 | He et al. | 375/260 |
| 2004/0063399 A1 * | 4/2004 | Milbar | 455/3.01 |
| 2004/0171366 A1 | 9/2004 | Bar-Ness | |
| 2004/0184399 A1 | 9/2004 | Chiou | |
| 2004/0190560 A1 * | 9/2004 | Maltsev et al. | 370/503 |
| 2004/0228417 A1 * | 11/2004 | Kennedy et al. | 375/260 |
| 2005/0117660 A1 * | 6/2005 | Vialle et al. | 375/299 |
| 2005/0141657 A1 * | 6/2005 | Maltsev et al. | 375/346 |
| 2005/0157639 A1 * | 7/2005 | Song et al. | 370/208 |
| 2005/0238089 A1 * | 10/2005 | Kodama et al. | 375/222 |
| 2005/0238109 A1 * | 10/2005 | Koga et al. | 375/260 |
| 2005/0265489 A1 * | 12/2005 | Chang et al. | 375/340 |
| 2006/0114816 A1 * | 6/2006 | Maltsev et al. | 370/210 |

(Continued)

FOREIGN PATENT DOCUMENTS

| | | |
|---|---|---|
| EP | 0 933 903 A2 | 8/1999 |
| GB | 2 365 283 A | 7/2000 |
| WO | WO 03/047196 A2 | 6/2003 |

OTHER PUBLICATIONS

Munier, F. et al. Receiver Algorithms for OFDM Systems in Phase Noise and AWGN. Proc. IEEE Int'l Symp. Personal, Indoor, and Mobile Radio Comm. Sep. 2004 (5 pp.).

(Continued)

*Primary Examiner*—Temesghen Ghebretinsae
(74) *Attorney, Agent, or Firm*—Hartman Patents PLLC

(57) ABSTRACT

A method of signal processing according to an embodiment includes estimating a response of a transmission channel during a symbol period. Based on an estimated response of the transmission channel, components of a model of a phase noise process during the symbol period are estimated. Based on the phase noise process model, an estimate of a symbol received during the symbol period is obtained.

42 Claims, 10 Drawing Sheets

U.S. PATENT DOCUMENTS

| | | | |
|---|---|---|---|
| 2006/0159187 A1* | 7/2006 | Wang et al. | 375/260 |
| 2006/0166634 A1* | 7/2006 | Ido | 455/277.1 |
| 2006/0176941 A1* | 8/2006 | Nieto et al. | 375/152 |
| 2006/0251198 A1* | 11/2006 | Ma et al. | 375/350 |
| 2007/0242600 A1* | 10/2007 | Li et al. | 370/210 |
| 2008/0008082 A1* | 1/2008 | Ma et al. | 370/203 |
| 2008/0043827 A1* | 2/2008 | Renfors et al. | 375/230 |

OTHER PUBLICATIONS

Stott, J. The effects of phase noise in COFDM. EBU Technical Review, Summer 1988, pp. 1-22.

Abhayawardhana, VS and Wassell, IJ. Common Phase Error Correction for OFDM in Wireless Communication. CSNDSP, Jul. 2002 (4 pp.).

Armada, AG et al. Analysis of Phase Noise Effects in Multi-User OFDM. ISCCSP 2004, pp. 63-66.

Casas, RA et al. Time Domain Phase Noise Correction for OFDM Signals. IEEE Trans. on Broadcasting, vol. 28, No. 3 , Sep. 2002, pp. 230-236.

Gholami, MR et al. A New Method of Phase Noise Compensation in OFDM. Proc. 2003 IEEE Conf. Commun., vol. 5, May 2003, pp. 3443-3446.

Muller, RR and Verdu, S. Design and Analysis of Low-Complexity Interference Mitigation on Vector Channels. IEEE J. Sel. Areas Commun., vol. 19, No. 8, Aug. 2001, pp. 1429-1441.

Petrovic, D et al. Phase Noise Suppression in OFDM Including Intercarrier Interference. Proc. 2003 Intl. OFDM Workshop, Sep. 2003 (5 pp.).

Shentu, J et al. Effects of Phase Noise on Performance of OFDM Systems Using an ICI Cancellation Scheme. IEEE Trans. on Broadcasting, vol. 49, No. 2, Jun. 2003, pp. 221-224.

Armada, AG. Understanding the effects of phase noise in orthogonal frequency division multiplexing (OFDM). IEEE Trans. on Broadcasting, vol. 47, No. 2, Jun. 2001, pp. 153-159.

Shentu, J. et al. Effects of Phase Noise on Performance of PCC-OFDM. Proc. 1st Wkshp. on I'net, Telecom., and Sig. Proc. WITSP'02, Dec. 2002, Wollongang, AU (5 pp.).

Suraweera, H. et al. M-QAM OFDM and PCC-OFDM Performance in the Presence of Phase Noise. Proc. 5th Aust. Comm. Theory Wkshp. (AusCTW 2004), Newcastle, AU, Feb. 2004 (5 pp.).

\* cited by examiner

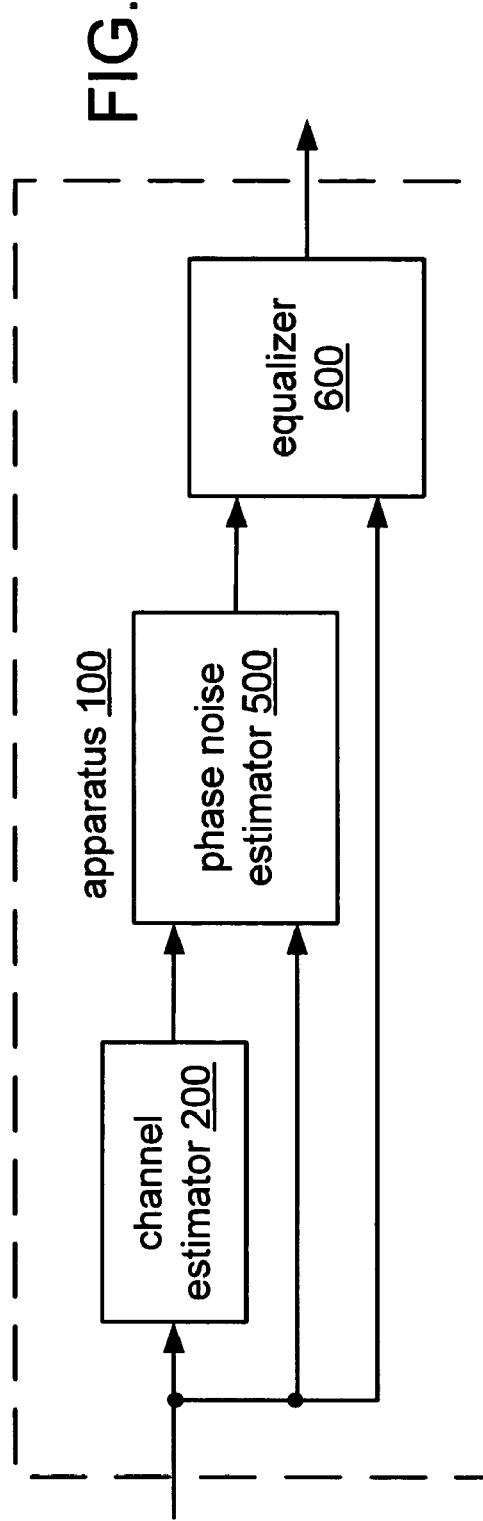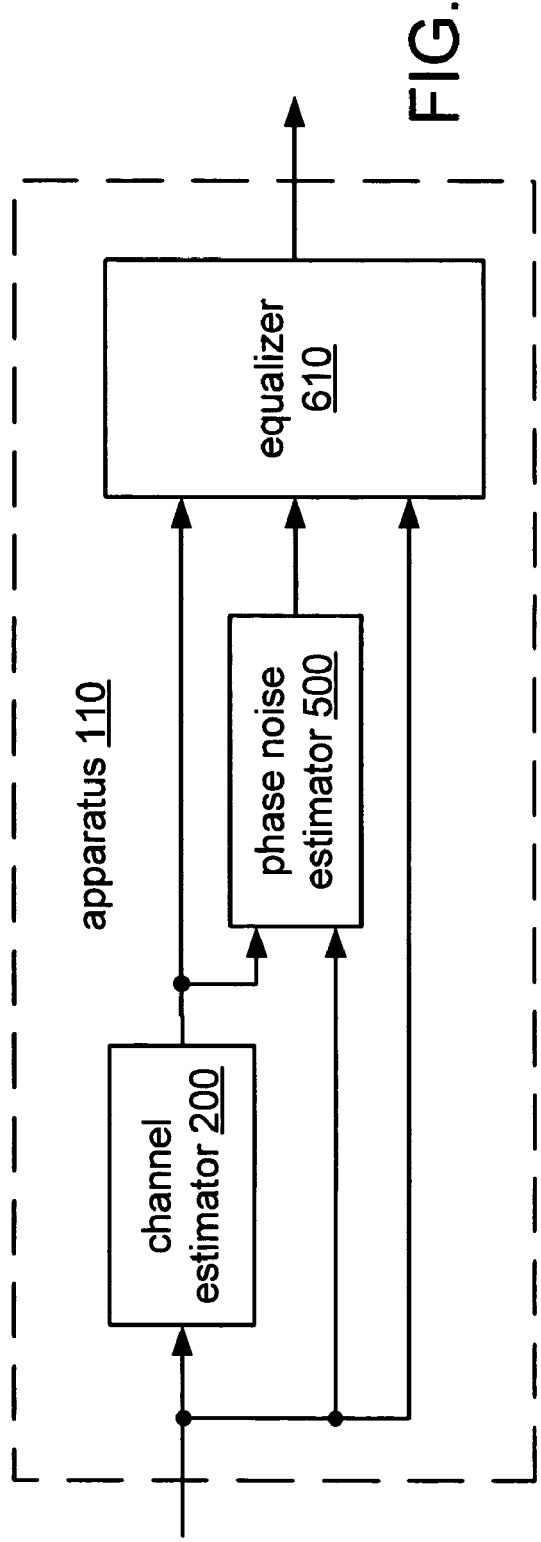

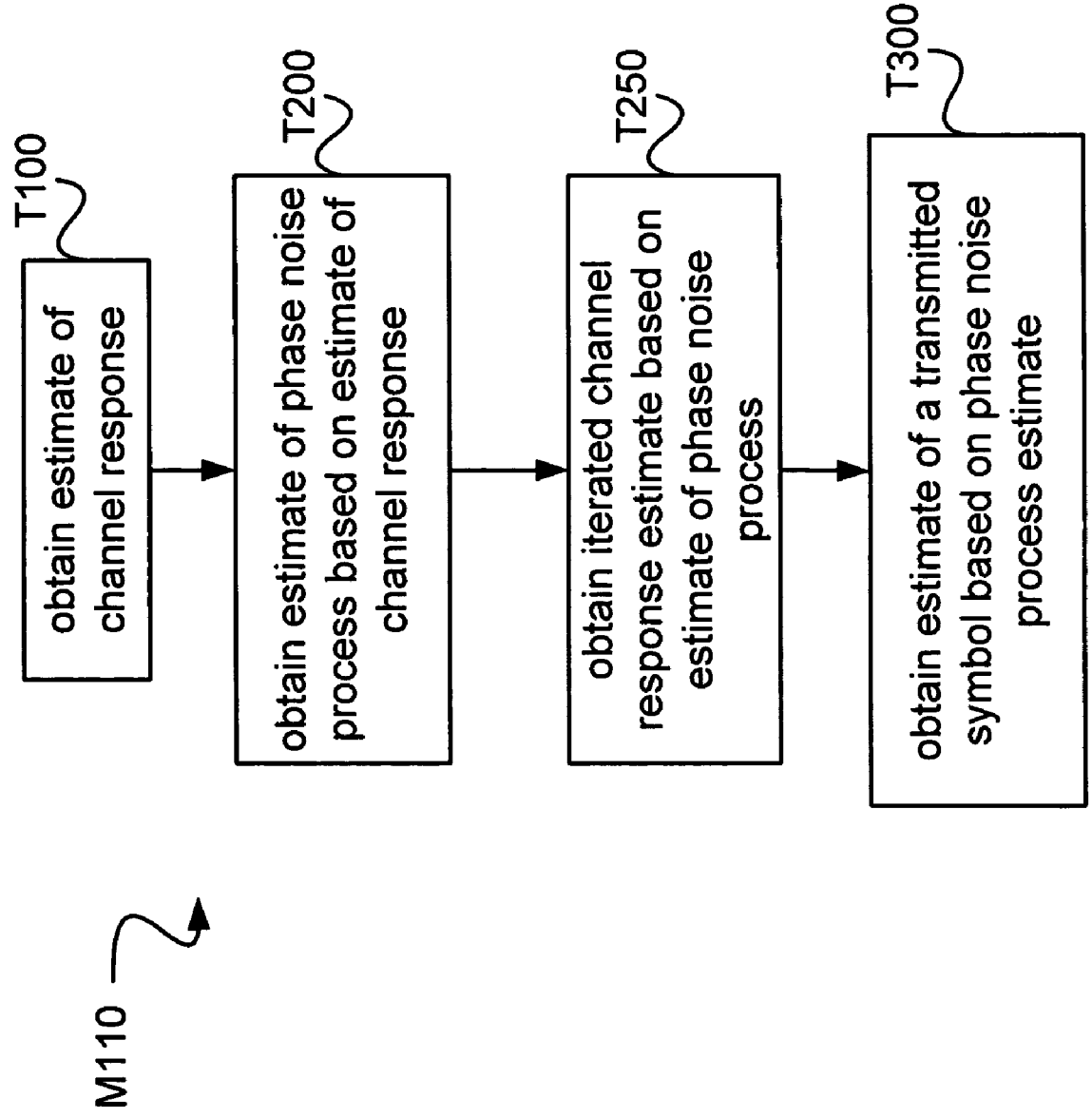

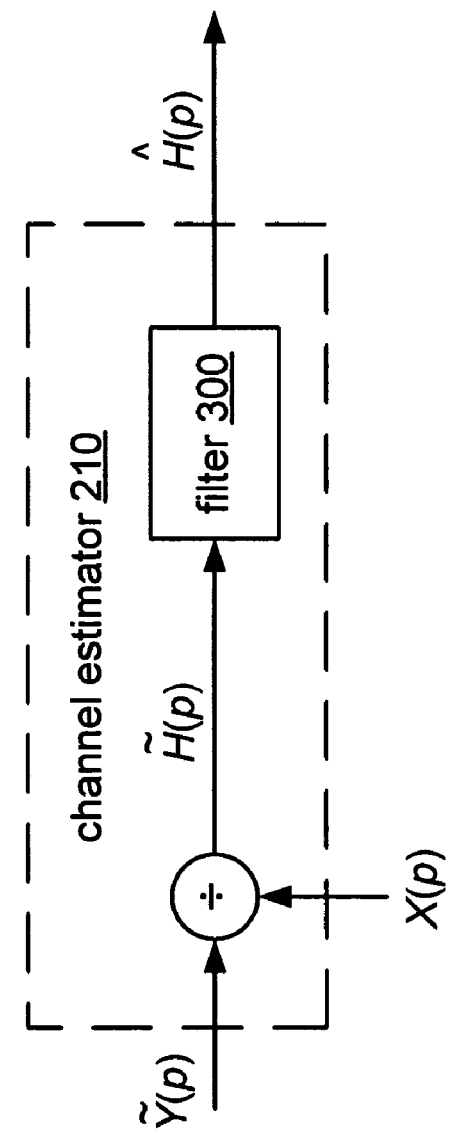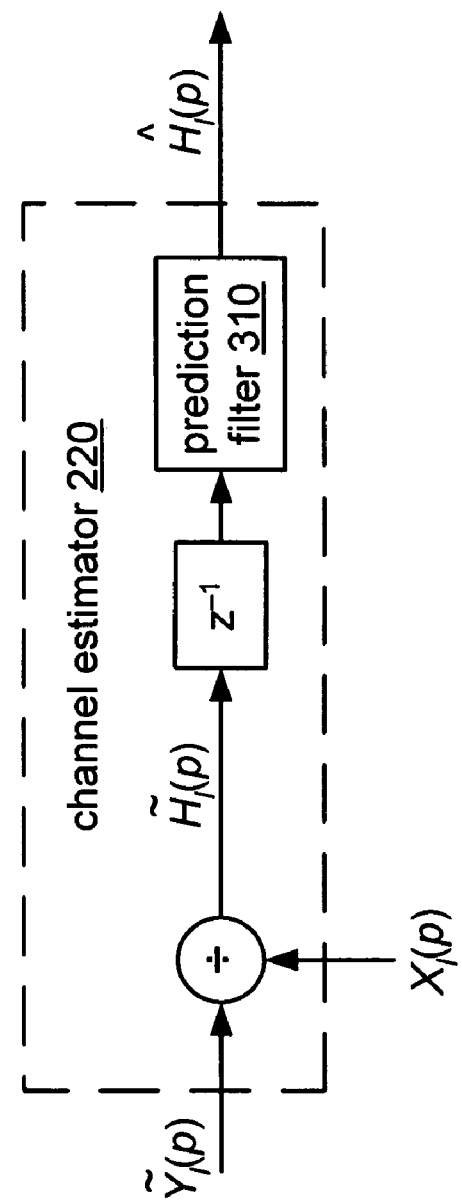

SYSTEMS, METHODS, AND APPARATUS FOR PHASE NOISE MITIGATION

FIELD OF THE INVENTION

This invention relates to wireless communications.

BACKGROUND

Multicarrier technology has been applied or tested in many different fields of communications, ranging from terrestrial uses to satellite communications, and from home networking to broadcast television transmission. Potential advantages of such technology include increased throughput and greater bandwidth utilization. One spectrally efficient form of multicarrier technology—orthogonal frequency division multiplexing (OFDM)—is already in common use in such varied applications as digital audio broadcasting (DAB), digital terrestrial television broadcasting (DVB-T or ISDB-T), digital television broadcasting for handheld devices (DVB-H), terrestrial and handheld digital multimedia broadcasting (DMB-T/H), digital subscriber line (DSL) for high-bit-rate digital subscriber services on twisted pair channels, and wireless networking under such standards as IEEE 802.11 and 802.16.

A multicarrier system design may be selected from among several different configurations. For example, a single-input, single-output (SISO) system transmits one multicarrier signal, while a multiple-input, multiple-output (MIMO) system transmits multiple multicarrier signals over the same band and includes antenna arrays at the transmitter and receiver. The modulation scheme to be applied may also be selected from among many different design options. Typically a phase-shift keying (PSK) scheme is used, such as quadrature PSK (QPSK), quadrature amplitude modulation (QAM), or offset QAM (OQAM). Typical QAM schemes include 4-, 16-, 64-, 256-, and 1024-QAM.

One example of an OFDM application, Terrestrial Digital Video Broadcast or "DVB-T," is specified in the European Telecommunications Standards Institute document EN 300 744. The DVB-T specification provides for a 2K mode (with 1705 subcarriers spaced about 4.5 kHz apart) and an 8K mode (with 6817 subcarriers spaced about 1.1 kHz apart), with the multicarrier signal being transmitted over a bandwidth of 6, 7, or 8 MHz. The related handheld specification (DVB-H) also provides for a 4K mode (with 3409 subcarriers). Modulation schemes used in a DVB system may include QPSK, 16-QAM, and/or 64-QAM.

Accurate channel estimation is an important factor in obtaining a low bit-error rate for a multicarrier system. Channel estimation becomes especially important in situations where the channel may be time-varying, such as mobile applications.

SUMMARY

A method of signal processing according to an embodiment includes estimating a response of a transmission channel during a symbol period at a plurality of frequencies and, based on a result of estimating a response of a transmission channel, estimating a plurality of components of a model of a phase noise process during the symbol period. This method also includes, based on a result of estimating a plurality of components of a model of a phase noise process, estimating a plurality of values of a symbol received during the symbol period.

A signal processing apparatus according to an embodiment includes a channel estimator configured to estimate a response of a transmission channel during a symbol period at a plurality of frequencies and a phase noise estimator configured to calculate, based on the estimated response of the transmission channel, a plurality of components of a model of a phase noise process during the symbol period. The apparatus also includes an equalizer configured to estimate, based on the plurality of components of a model of a phase noise process, a plurality of values of a symbol received during the symbol period.

BRIEF DESCRIPTION OF THE DRAWINGS

FIG. 5A is a block diagram of an apparatus 100 according to an embodiment.

FIG. 5B is a block diagram of an implementation 110 of apparatus 100.

FIG. 6 shows a flowchart of an implementation M110 of method M100.

FIG. 8A is a block diagram of an implementation 210 of channel estimator 200.

FIG. 8B is a block diagram of an implementation 220 of channel estimator 200.

DETAILED DESCRIPTION

In the following description, the symbol j is used in two different ways. In some instances, the symbol j denotes the imaginary square root of −1 (as in $e^{j\Phi(i)}$). In other instances, the symbol j is used to indicate an index, such as a column of a matrix (as in $W_{ij}$). Both usages are common in the art, and one of skill will recognize which one of the two is intended from the context in which each instance of the symbol j appears.

In the following description, an underscore is used to indicate a vector (as in $\underline{h}$), and bold face is used to indicate a matrix (as in W).

Figure 1:
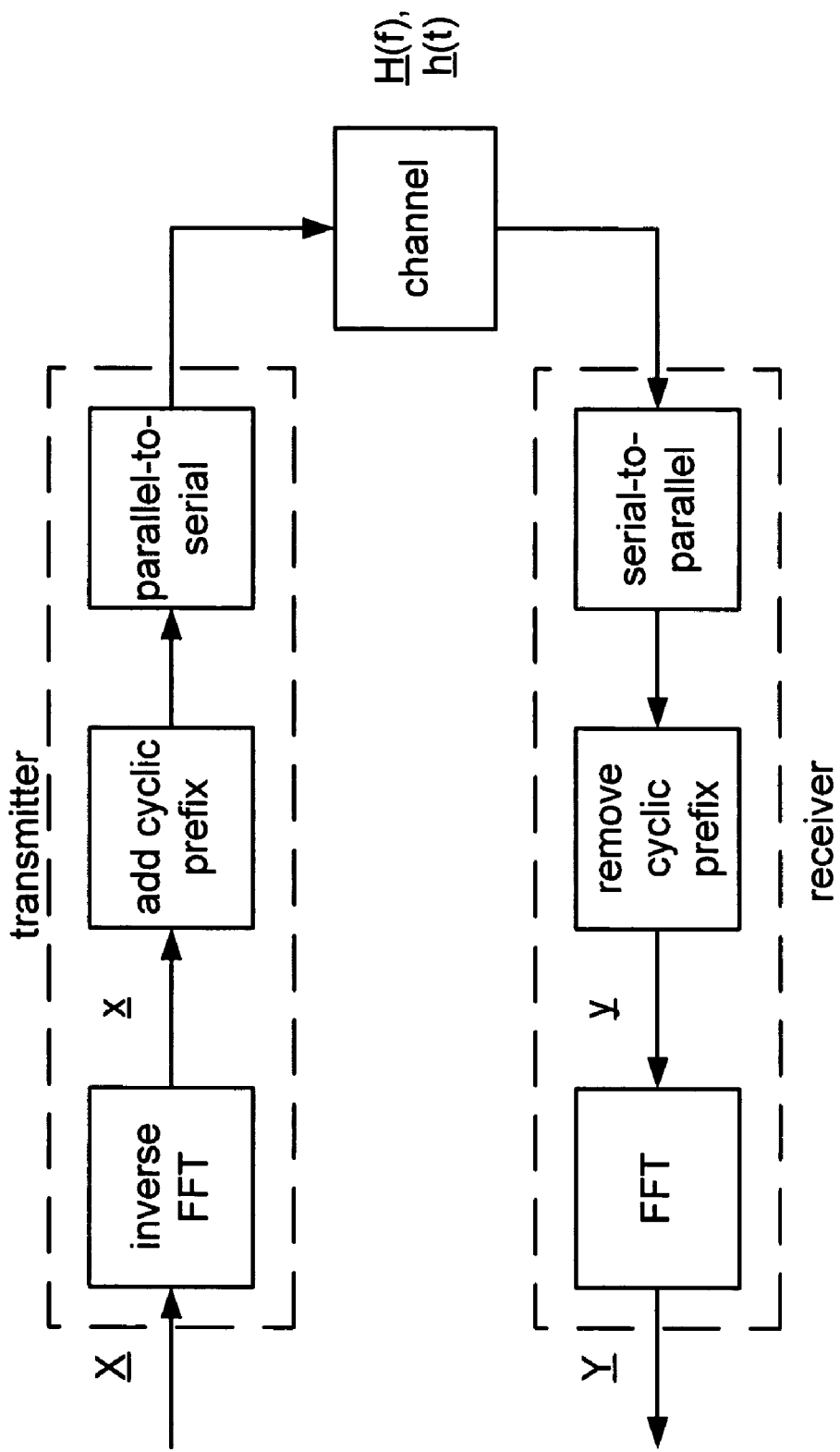
FIG. 1 is a block diagram showing an example of an OFDM system.

FIG. 1 shows a block diagram of a representative OFDM system. The transmitter receives a symbol X having M complex values, each representing a data value modulated onto a corresponding one of M subcarriers. The data values may be derived from one serial data stream, such as a television or other high-bandwidth signal. Alternatively, the data values may be derived from more than one (up to M) different data streams, as in a multiple-access system. In addition to data values corresponding to user traffic, the data values may also include one or more pilot signals whose values are a deterministic function of time and/or frequency (based on a known pseudorandom sequence, for example). The symbol X may also include null values interspersed among the data values and/or clustered apart from the data values (e.g. at values corresponding to carriers at the lowest and/or highest ends of the frequency range).

The subcarriers may be modulated according to a scheme such as m-ary PSK (e.g. QPSK) or m-ary QAM (e.g. 16-QAM or 64-QAM). The modulation scheme may vary from one subcarrier to another, as such variation may increase capacity or reduce bit-error rate under some constraints. Error detection, error correction, and/or redundancy coding operations, such as encoding, puncturing, and/or interleaving, may already have been performed on the data values prior to modulation.

Figure 2A:
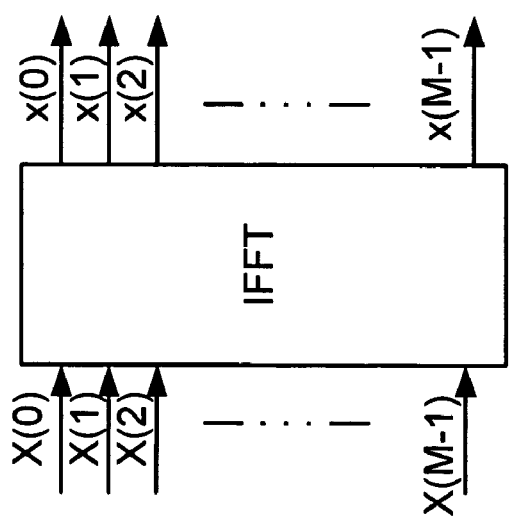
FIGS. 2A and 2B show inputs and outputs of an inverse FFT operation and an FFT operation, respectively.

As depicted in FIG. 2A, the transmitter applies an inverse fast Fourier transform or FFT (of at least M points) to the symbol X to obtain a corresponding complex time-domain sequence x. The transmitter may also insert a guard interval between symbols to reduce intersymbol interference. Typically, the transmitter inserts this interval by cyclic extension of the sequence x. For example, the transmitter may append a copy of the last N bits of the sequence x to the start of the sequence as a cyclic prefix, where the length N of the cyclic prefix is selected to be at least as large as the expected length L of the channel impulse response. A DVB transmitter may be configured to apply a guard interval of 1/32, 1/16, 1/8, or 1/4 of the length of the sequence. Either before or after the guard interval is inserted, the time-domain sequence is serialized for transmission. More than one such transmitter may be present in a MIMO system.

Figure 3:
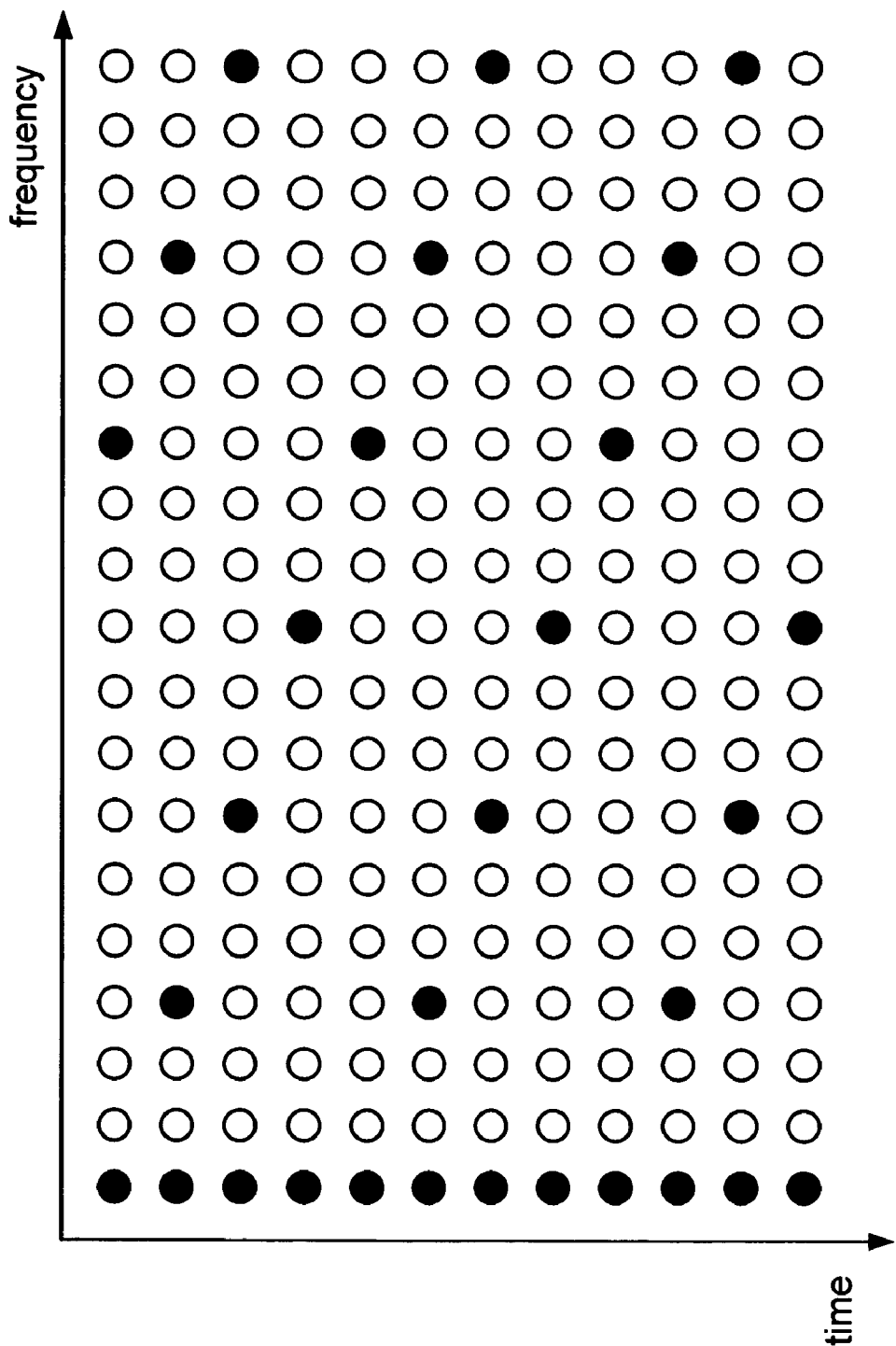
FIG. 3 is a diagram depicting a portion of a pilot scheme including a continuous pilot and scattered pilots.

Some of the M subcarriers may be reserved to carry a pilot signal. Typically the pilot signals form a pattern of data values that may be known a priori at the receiver. The pilot carrier assignments may be distributed across the frequency range, such that the channel response may be sampled across the bandwidth of the transmission. The carrier assignment scheme may be fixed or may vary over time. The DVB specifications provide for a scheme that includes continuous pilots, in which a carrier is modulated with a pilot signal during each symbol, and scattered pilots, in which a carrier is modulated with a pilot signal during some symbols and with a traffic signal during other symbols. FIG. 3 shows one example of such an assignment scheme, in which open circles represent traffic channels and filled circles represent pilot channels. In this example, the scattered pilots occur at intervals of twelve carriers in frequency and according to a pattern that is staggered by three carriers from one symbol to the next and has a period of four symbols in time.

Figure 2B:
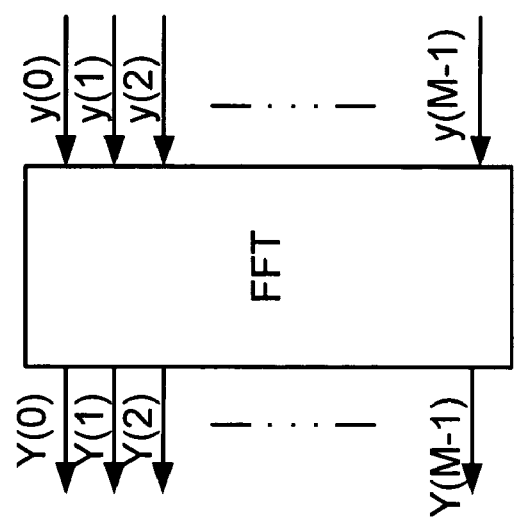

Effects of the transmission channel may include random noise (e.g. additive white Gaussian noise) and multipath fading. The channel effects are modeled as a function h of time and/or as a function H of frequency. At the receiver, the signal is parallelized and the cyclic extension is removed. The resulting time-domain signal y is converted (e.g. using an FFT) to the received frequency-domain symbol Y, as depicted in FIG. 2B. The symbol Y is equalized to obtain an estimate of the transmitted symbol X. Further processing may include demodulation and decoding.

As compared to a single-carrier system, a multicarrier system such as an OFDM system may exhibit reduced ISI and increased robustness to multipath effects. Orthogonality of consecutive symbols over time is maintained by inserting a guard interval such as a cyclic extension (e.g. prefix). OFDM systems also tend to have a relatively flat frequency response across each narrow subchannel.

However, an OFDM system may become more sensitive to loss of orthogonality of the carriers (e.g. crosstalk) as the number of subchannels increases. OFDM systems are typically very sensitive to phase noise in this regard, as a phase noise process may cause a subcarrier to interfere with other subcarriers.

It may be desirable to use low-cost oscillators in an OFDM receiver for consumer markets (e.g. for handheld and other portable devices). Such oscillators tend to have relatively low accuracy and/or stability, which may give rise to phase noise. The tuner's local oscillator is typically the primary source of phase noise in a receiver. Especially in systems having a large number of subcarriers, phase noise in the downconversion to baseband may be a limiting factor in the performance of the receiver as a whole.

A tuner of a DVB-T demodulator may be required to have a phase noise specification of −85 dBc or better at 10 kHz offset. In order to meet such constraints without using more expensive and/or larger oscillators, it may be desirable to include phase noise mitigation among the digital processing operations performed on the received signal. Such an approach may also reduce design time and system costs.

It may be desirable to support reception of multicarrier or OFDM signals in mobile applications ranging from low-mobility portable devices to on-board vehicle equipment. For example, it may be desirable to support reception of DVB signals in a mobile environment. The channel response may be expected to vary over time in a mobile application, such that channel estimation becomes more important and also more difficult. The presence of phase noise can be expected to degrade the quality of a channel estimation.

Figure 4:
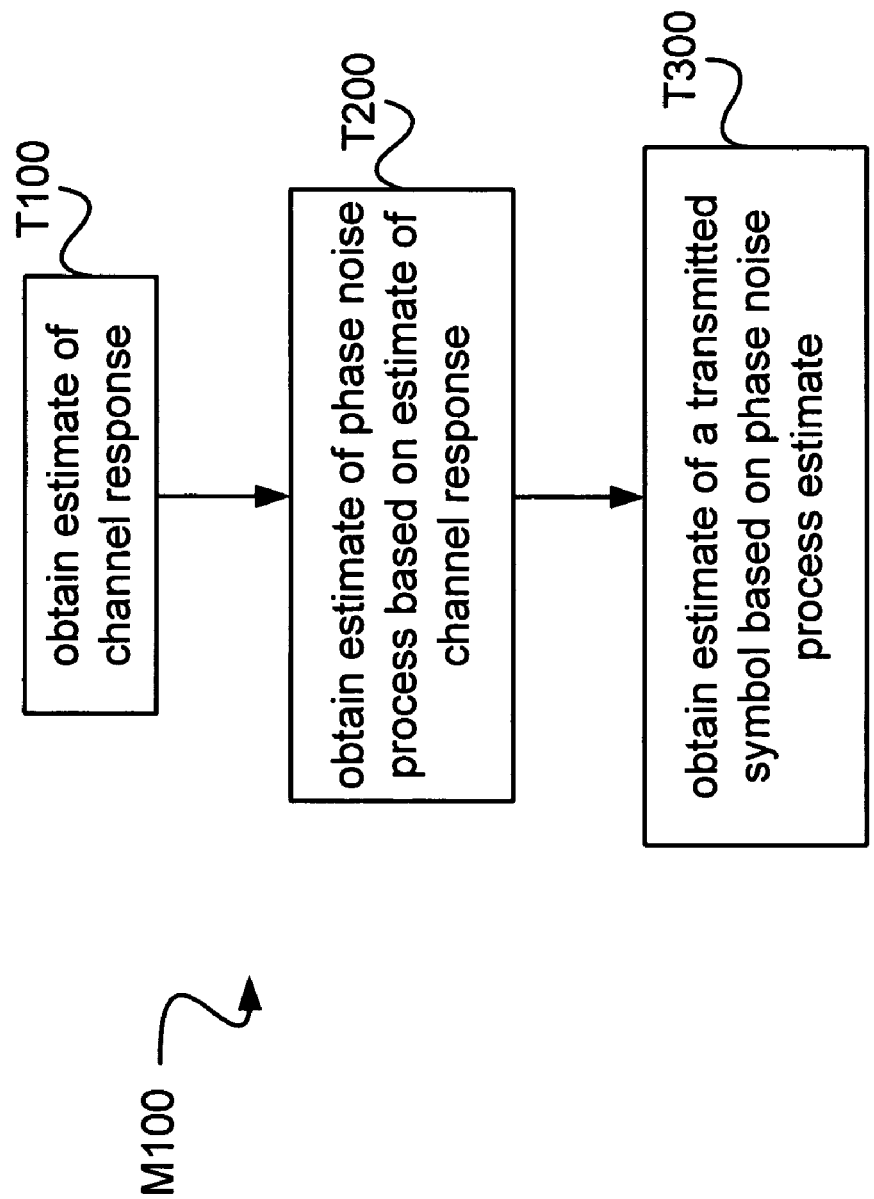
FIG. 4 is a flowchart of a method M100 according to an embodiment.

FIG. 4 shows a flowchart of a method M100 according to an embodiment. Task T100 obtains an estimate of a channel response based on at least one received symbol. Task T200 obtains an estimate of a phase noise process based on the channel response estimate. Task T300 obtains an estimate of a transmitted symbol based on the phase noise process estimate. At least some implementations of method M100 may be applied in an environment where the channel response is slowly time-varying (e.g. is expected to change from symbol to symbol but to remain relatively constant within a symbol period). As described herein, implementations of method M100 include methods that may be applied in the time domain and methods that may be applied in the frequency domain.

FIG. 5A shows a block diagram of an apparatus 100 according to an embodiment. Channel estimator 200 obtains an estimate of a channel response based on at least one received symbol. For example, channel estimator 200 may perform an implementation of task T100 as disclosed herein. Phase noise estimator 500 obtains an estimate of a phase noise process based on the received signal and the channel response estimate. For example, phase noise estimator 500 may perform an implementation of task T200 as disclosed herein. Equalizer 600 obtains an estimate of a transmitted symbol based on the received signal and the phase noise process estimate. For example, equalizer 600 may perform an implementation of task T300 as disclosed herein.

FIG. 5B shows a block diagram of an implementation 110 of apparatus 100. Apparatus 110 includes an implementation 610 of equalizer 600 that obtains an estimate of a transmitted symbol based on the received signal, the phase noise process estimate, and the channel response estimate. Further implementations of apparatus 100 include an interpolator 400 configured to obtain estimates of data channel responses based on estimates of pilot channel responses.

The various elements of apparatus 100 may be implemented as electronic and/or optical devices residing, for example, on the same chip or among two or more chips in a chipset, although other arrangements without such limitation are also contemplated. One or more elements of apparatus 100 may be implemented in whole or in part as one or more sets of instructions executing on one or more fixed or programmable arrays of logic elements (e.g. transistors, gates) such as microprocessors, embedded processors, IP cores, digital signal processors, FPGAs (field-programmable gate arrays), ASSPs (application-specific standard products), and ASICs (application-specific integrated circuits). It is also possible for one or more such elements to have structure in common (e.g. a processor used to execute portions of code corresponding to different elements at different times, or an arrangement of electronic and/or optical devices performing operations for different elements at different times).

In the absence of phase noise, a multicarrier signal as received over one symbol period may be modeled in the time domain as a function of the transmitted symbol, the channel response, and a random noise process:

$$y(i) = \sum_{l=0}^{L-1} h_l x(i-l) + n(i), 0 \le i \le M-1, \quad (1.1)$$

where y(i) denotes the signal as received at time i, h(l) denotes the channel impulse response at delay l, x(i) denotes the time-domain transmitted signal at time i, n(i) denotes a value of a random noise process at time i, M denotes the number of subbands, and L denotes the length of the channel impulse response. The random noise process $\underline{n}$ may be assumed to have Gaussian statistics with zero mean and variance $\sigma^2$.

In the frequency domain, the model of expression (1.1) may be expressed as $$\underline{Y} = H\underline{X} + \underline{N}, \quad (1.2)$$

where column vector $\underline{Y}$ denotes the frequency transform of $\underline{y}$; column vector $\underline{X}$ denotes the frequency transform of $\underline{x}$; column vector $\underline{N}$ denotes the frequency transform of $\underline{n}$; and H is a diagonal matrix whose diagonal is the vector $W_L \underline{h}$, where the (M×L) matrix $W_L$ is a frequency transform matrix. The frequency transform used will typically be the discrete Fourier transform (DFT), which may be implemented using any of the various fast Fourier transform (FFT) methods. In one example, the matrix $W_L$ is the first L columns of the (M×M) DFT matrix W, whose elements are defined as $$W_{ij} = e^{-j2\pi \frac{ij}{M}},$$

where the indices i and j, $0 \le i,j \le M-1$, denote row and column, respectively. The transform operation may include a scaling factor of $$\frac{1}{M}.$$

Alternatively, this factor may be applied in the inverse transform operation instead or may be split between the two operations (e.g. each of the transform and inverse transform operations being scaled by $$\left. \frac{1}{\sqrt{M}} \right).$$

The vector $W_L \underline{h}$ may also be expressed as the M-element column vector $\underline{H}$. (As will be understood from the context, a notation H may also be used herein to denote a channel estimate vector having fewer than M elements.)

The time-domain model of expression (1.1) may be changed to account for effects of a phase noise process:

$$\tilde{y}(i) = e^{j\phi(i)} \sum_{l=0}^{L-1} h_l x(i-l) + n(i), 0 \le i \le M-1, \quad (1.3)$$

where $\tilde{y}(i)$ denotes the signal as received in the presence of phase noise at time i, and $\phi(i)$ denotes a value of the phase noise process at time i. The M values of the phase noise process over a symbol period may be expressed in column vector form as $$\underline{\phi} = [e^{j\phi(0)}, \ldots, e^{j\phi(M-1)}]^T$$

such that $\tilde{y}(i) = y(i)\phi(i)$. In a method according to an embodiment, values are determined for the complex conjugate $\underline{\phi}^*$ of the phase noise vector $\underline{\phi}$. The vector $\underline{\phi}^*$ may then be applied to counteract effects of the phase noise process in the received signal, such as a loss of orthogonality. For example, the modeled phase noise process may be compensated according to the relation $\tilde{y}(i)\phi^*(i) = y(i)\phi(i)\phi^*(i) = y(i)$.

Task T100 obtains an estimate of a channel response based on at least one received symbol. Of the various parameters in the model of expression (1.3), the received signal $\tilde{\underline{y}}$ is known, and at least some of the components of the transmitted signal $\underline{X}$ may also be known. In an application where known values (such as pilot signals) are transmitted over some set P of the subcarriers, knowledge of those components of $\underline{X}$ may be used to obtain initial estimates for the channel responses h for those subcarriers.

As noted above, pilot signals may be distributed across the range of subcarriers in time and/or frequency. In some applications, null carriers may be used with or instead of pilot signals. Although this description primarily uses the example of pilot signals in reference to known transmitted values, it should be understood that prior knowledge of transmitted values due to other data structures (such as packet headers) or time-based activities (such as synchronization sequences) may also be applied in estimating channel responses.

Task T100 may be implemented to obtain an estimate of the channel response by dividing the received signal by a known transmitted value:

$$\tilde{H}(p) = \frac{\tilde{Y}(p)}{X(p)}, p \in P,$$

where $\tilde{\underline{Y}}$ denotes the frequency-domain received signal in the presence of phase noise. Task T100 may also be configured to include an interpolation operation (in time and/or frequency) to obtain channel response estimates for subcarriers not in set P. The channel response estimate $\tilde{H}$ may be suboptimal, however, as it includes the effects of the phase noise and random noise processes. Implementations of task T100 that obtain a filtered channel response estimate $\hat{H}$ are also described herein. A method according to an embodiment may also include a task T250 that obtains an iterated channel response estimate based on an estimate of the phase noise process as obtained in task T200 and/or a task T350 that obtains an iterated channel response estimate based on an estimate of a transmitted symbol as obtained in task T300.

Task T200 obtains an estimate of a phase noise process based on the channel response estimate. In an implementation T210 of task T200, the phase-noise vector $\underline{\phi}^*$ is modeled as a sum of discrete time-domain components. For example, this vector may be modeled as the product of an (M×K)-element basis function matrix B and a (K×1)-element coefficient vector $\underline{\alpha}$. The number of unknown parameters to be estimated may be reduced by setting the value of K to be less than M. One basis set that may be used is the discrete Fourier transform (DFT) basis vectors:

$$B_{ij} = e^{j2\pi \frac{ij}{M}}, 0 \le i \le M-1, 0 \le j \le K-1.$$

Another basis set that may be used is the discrete cosine transform (DCT) basis vectors:

$$B_{ij} = \cos\pi \frac{ij}{M}, 0 \le i \le M-1, 0 \le j \le K-1.$$

Other sets of polynomial functions may also be used as basis sets.

Expression (1.2) may be rewritten to incorporate the model $\underline{\phi}^* = B\underline{\alpha}$ and the relation $\tilde{y}(i) \underline{\phi}^*(i) = y(i)$ as follows:

$$\frac{1}{\sqrt{M}} W\tilde{y}B\underline{\alpha} = H\underline{X} + \underline{N}, \quad (1.4)$$

where $\tilde{y} = \text{diag}(\underline{\tilde{y}})$ and $H_{ii} = \tilde{H}(i)$ or $\hat{H}(i)$. A least-squares method may then be used to obtain an expression for the time-domain phase noise process, as in the following example:

$$\underline{\hat{\phi}}^* = B\underline{\hat{\alpha}} = \sqrt{M}B(H^{-1}W\tilde{y}B)^+ \underline{X}, \quad (1.5)$$

where the operator $(\bullet)^+$ indicates the pseudoinverse: $A^+ = (A^H A)^{-1} A^H$. Task T210 may be configured to obtain an estimate $\underline{\hat{\phi}}^*$ of the time-domain phase noise process according to such an expression based on the received signal $\underline{\tilde{y}}$, basis matrix B, transmitted signal $\underline{X}$, and channel response estimate H.

In a case where the signals transmitted over a set P of the subcarriers are known (for example, pilot signals), expression (1.5) may be modified to include only those elements of $\underline{X}$ that correspond to carriers $p \in P$:

$$\underline{\hat{\phi}}^* = B\underline{\hat{\alpha}} = \sqrt{M}B(H_p^{-1}W_p\tilde{y}B)^+ \underline{X}_p, \quad (1.6)$$

where $\underline{X}_p$ is the vector of known signals, $H_p$ is a diagonal matrix having channel frequency responses for the subcarriers of the known signals as diagonal elements, and $W_p$ is the reduced W having those rows corresponding to positions of the known signals.

Task T300 obtains an estimate of a transmitted symbol based on the phase noise process estimate. An implementation T310 of task T300 applies the vector $\underline{\hat{\phi}}^*$ to the received signal $\underline{\tilde{y}}$ and obtains an estimate $\underline{\hat{X}}$ of the transmitted symbol in the frequency domain. For example, task T310 may obtain an estimate $\underline{\hat{X}}$ according to the following expression:

$$\hat{X}(m) = \frac{Y(m)}{\hat{H}(m)} \left( \text{or} \frac{Y(m)}{\tilde{H}(m)} \right),$$

where $\underline{Y}$ is obtained by applying the phase-noise model $\underline{\hat{\phi}}^*$ and an inverse transform to the received signal $\underline{\tilde{y}}$ (e.g. $\underline{Y} = W\tilde{y}\underline{\hat{\phi}}^*$). As the elements of the phase noise process vector $\underline{\phi}$ have unit magnitude, it may be desirable (e.g. prior to executing task T300) to scale the elements of $\underline{\hat{\phi}}^*$ to have unit magnitude without changing their angles.

FIG. 6 shows a flowchart of a further implementation M110 of method M100. Method M110 includes a task T250 that obtains an iterated channel response estimate based on an estimate of the phase noise process as obtained in task T200. Task T250 may be configured to obtain channel response estimates for one or more subcarriers of pilot set P, which may then be interpolated to obtain channel response estimates for one or more subcarriers (e.g. all data subcarriers) not in set P. In an apparatus according to an embodiment, channel estimator 200 may perform tasks T200 and T250, or another channel estimator may be provided to perform task T250. Before executing task T300, it may be desired to iterate task T200 based on a channel response estimate obtained by task T250, and possibly to cycle between tasks T200 and T250 one or more times.

Figure 7:
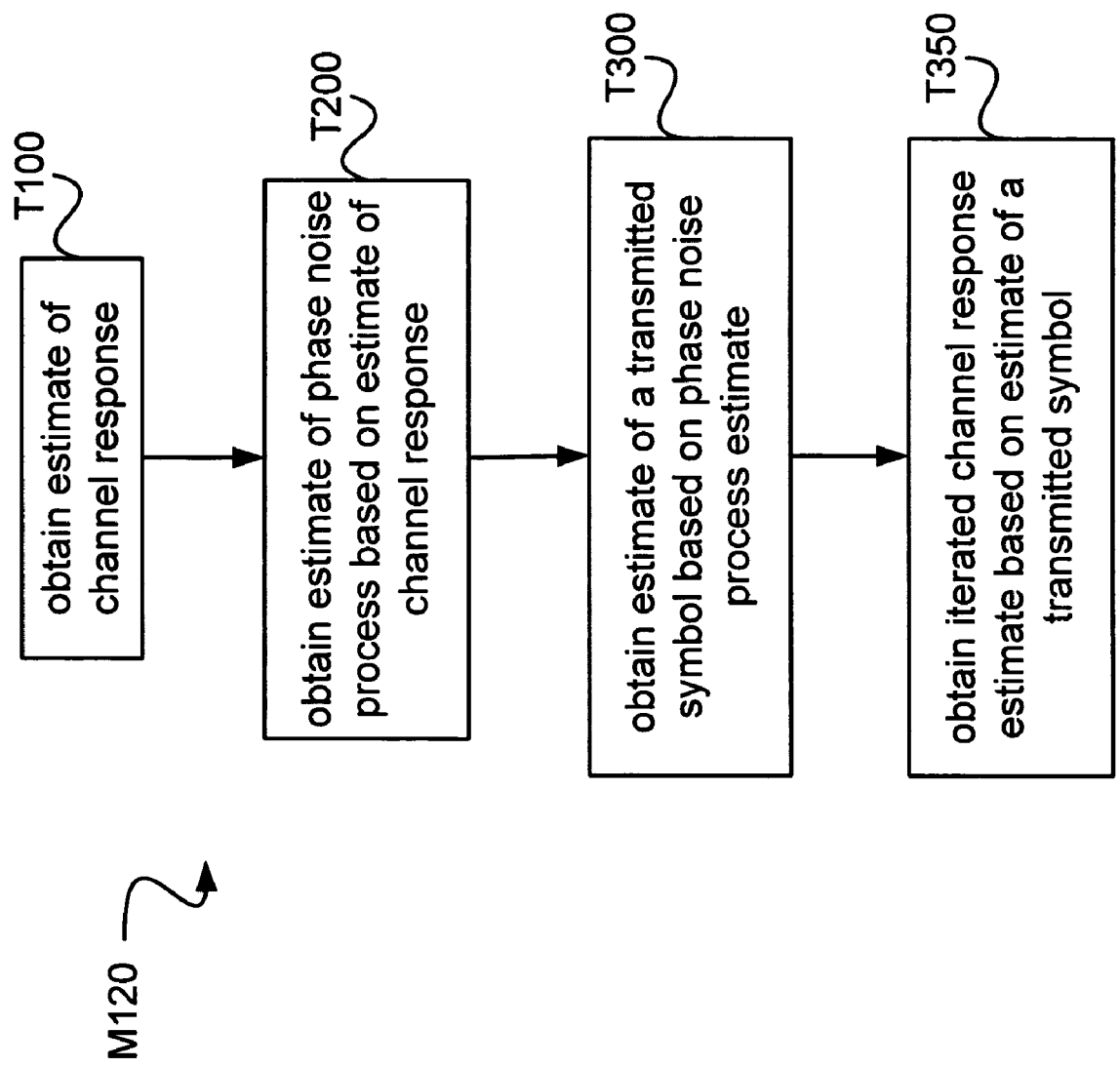
FIG. 7 shows a flowchart of an implementation M120 of method M100.

FIG. 7 shows a flowchart of another implementation M120 of method M100. Method M120 includes a task T350 that obtains an iterated channel response estimate based on estimated transmitted values $\hat{X}$ as obtained in task T300. For example, task T350 may obtain an iterated channel response estimate according to the expression:

$$\underline{\hat{H}}^{(1)} = \frac{1}{\sqrt{M}} \hat{X} W \underline{\hat{y}} \underline{\hat{\phi}}^*,$$

where $\hat{X} = \text{diag}(\underline{\hat{X}})$ and $\underline{\hat{X}}$ denotes the estimated transmitted values on the pilot subcarriers and the data subcarriers. One of skill will recognize that an updated estimate of the phase-noise process vector $\underline{\hat{\phi}}^*$ and/or of the transmitted values $\underline{\hat{X}}$ may be obtained based on $\underline{\hat{H}}^{(1)}$ (from set P, or from more or all of the m subcarriers) if desired. In an apparatus according to an embodiment, channel estimator 200 may perform tasks T200 and T350 (and possibly task T250), or another channel estimator may be provided to perform task T350. It may be desired to iterate task T200 and/or T300 based on a channel response estimate obtained by task T350, and possibly to cycle between two or more of these tasks one or more times.

Calculating an estimate for the phase noise in the time domain may be computationally intensive. In addition to matrix inversion, a time-domain method may involve one or more additional FFT operations (e.g. in task T200) for each received symbol. While such complexity may be acceptable in a 64-carrier system (for example, for a wireless LAN), the cost of the additional chip area to support such operations may be prohibitive for systems having thousands of carriers (e.g. DVB-T/H).

As an alternative to the time-domain model of expression (1.3), a multicarrier signal as received over one symbol period may be expressed using a frequency-domain model. In the following frequency-domain model, each subcarrier is convolved with a corresponding frequency component of the phase noise process:

$$\tilde{Y}(m) = \sum_{n=0}^{M-1} X(n)H(n)\Phi(m-n) + N(m), \quad (2.1)$$

where m denotes the subcarrier ($0 \leq m \leq M-1$), column vector $\underline{X}$ denotes the frequency-domain transmitted symbol, column vector $\underline{\tilde{Y}}$ denotes the signal as received, column vector $\underline{H}$ denotes the channel frequency response, column vector $\underline{\Phi}$ denotes the phase noise process, and column vector $\underline{N}$ denotes a random noise process that may be assumed to have Gaussian statistics with zero mean and variance $\sigma^2$.

The model of expression (2.1) may be extended to express the received symbol in matrix form as $\underline{\tilde{Y}} = S\underline{\Phi} + \underline{N}$, where $$S = \begin{bmatrix} X(0)H(0) & X(M-1)H(M-1) & \cdots & X(1)H(1) \\ X(1)H(1) & X(0)H(0) & \cdots & X(2)H(2) \\ \vdots & \vdots & \ddots & \vdots \\ X(M-1)H(M-1) & X(M-2)H(M-2) & \cdots & X(0)H(0) \end{bmatrix}_{M \times M}.$$

An implementation T220 of task T200 estimates the phase noise process according to a frequency-domain model.

It may be desirable to modify a frequency-domain model as in expression (2.1) so that the effects of the phase noise process on each subcarrier are modeled using two components:

$$\tilde{Y}(m) = \Phi(0)X(m)H(m) + \sum_{n=0, n \neq m}^{M-1} X(n)H(n)\Phi(m-n) + N(m). \quad (2.2)$$

The DC component of the phase noise process model, $\Phi(0)$, represents a common phase error (CPE) that may be expected to affect all of the subchannels equally. This component is manifested in the received signal as a rotation of the demodulated constellation. The nonzero frequency components of the phase noise process model $$\Phi(i \neq 0) = \frac{1}{\sqrt{M}} \sum_{k=0}^{M-1} e^{j\phi(k)} e^{-j2\pi \frac{ki}{M}} \quad (2.3)$$

represent intercarrier interference (ICI) arising from loss of orthogonality of the subcarriers. These components are manifested in the received signal as a blurring of points in the demodulated constellation.

Typically, the output spectrum of a low-cost tuner cannot be modeled accurately as a delta function. As a result, at least some of the nonzero frequency components of the phase noise process vector $\underline{\Phi}$ have nonzero magnitude. It has been observed, however, that in many relevant cases the power spectral density of the phase noise process drops off quickly with frequency. In such cases, $\Phi(m)$ may decrease rapidly as m increases such that phase noise from carriers that are more than one or two subbands away is negligible. For example, low-cost tuners typically have spectra that decay approximately as $f^{-2}$. Such a characteristic may be exploited to reduce the number of parameters used to model the phase noise process.

An implementation T222 of task T220 estimates fewer than all of the (M−1) nonzero frequency components of the phase noise process. For example, task T222 may be configured to estimate only those frequency components which are expected to have nonnegligible magnitudes. A model as applied in one such implementation includes only the Q subcarriers on each side of the current subcarrier m, where $Q < (M-1)/2$:

$$\tilde{Y}(m) = \Phi(0)X(m)H(m) + \sum_{q=-Q, q \neq 0}^{Q} X(m+q)H(m+q)\Phi(q) + N(m). \quad (2.4)$$

In many applications, the value of Q may be limited to 2 or even 1. Depending on the characteristics of the particular phase noise process, the number of subcarriers included in the model need not be same on each side of subcarrier m. In some cases, the number of unknown parameters in expression (2.4) may be reduced further according to other properties of the phase noise process.

In some situations, an advantage may be gained by modeling the CPE $\Phi(0)$ and the channel response H(m) separately from one another (for example, if one or both of these factors are known a priori). Otherwise, a model as applied in task T220 may be simplified by modeling the two parameters together. In one example, expression (2.4) is modified by introducing an equivalent channel response parameter $H_e(m) = \Phi(0)H(m)$ and a corresponding equivalent phase noise parameter $$\Phi_e(q) = \frac{\Phi(q)}{\Phi(0)}:$$

$$\tilde{Y}(m) = X(m)H_e(m) = \sum_{q=-Q, q \neq 0}^{Q} X(m+q)H_e(m+q)\Phi_e(q) + N(m). \quad (2.5)$$

It may be desired to express the frequency-domain model in the matrix form $A\underline{x} = \underline{b}$ where $\underline{x}$ represents the phase noise process it is desired to estimate. For example, expression (2.5) may be re-written as $$\tilde{Y}(m) - X(m)H_e(m) = \sum_{q=-Q, q \neq 0}^{Q} X(m+q)H_e(m+q)\Phi_e(q) + N(m).$$

This expression is then used as the basis for the matrix equation $A\underline{\Phi}_e = \underline{b}$, where $$A = \begin{bmatrix} X(0-Q)H_e(0-Q) & \cdots & X(0+Q)H_e(0+Q) \\ \vdots & \ddots & \vdots \\ X(M-1-Q)H_e(M-1-Q) & \cdots & X(M-1+Q)H_e(M-1+Q) \end{bmatrix}_{M \times 2Q} \quad (2.6)$$

$\underline{\Phi}_e = [\Phi_e(-Q), \cdots, \Phi_e(-1), \Phi_e(1), \ldots, \Phi_e(Q)]_{2Q \times 1}^T$, and $$\underline{b} = \begin{bmatrix} \tilde{Y}(0) - X(0)H_e(0) \\ \vdots \\ \tilde{Y}(M-1) - X(M-1)H_e(M-1) \end{bmatrix}_{M \times 1}.$$

Task T220 may be implemented to solve the system $A\underline{\Phi}_e = \underline{b}$ for $\underline{\Phi}_e$. In one approach, a least-squares algorithm is applied to obtain the estimated equivalent phase-noise vector $\tilde{\underline{\Phi}}_e = A^+ \underline{b}$, where the pseudoinverse $A^+ = (A^H A)^{-1} A^H$.

Task T220 may be implemented to estimate an equivalent phase noise vector $\underline{\Phi}_e$ according to a reduced model of P components. In one such example, the system to be solved $A \underline{\Phi}_e = \underline{b}$ is re-written as $A_p \underline{\Phi}_e = \underline{b}_p$, where $$A_p = \begin{bmatrix} X(p_0 - Q)H_e(p_0 - Q) & \cdots & X(p_0 + Q)H_e(p_0 + Q) \\ \vdots & \ddots & \vdots \\ X(p_{P-1} - Q)H_e(p_{P-1} - Q) & \cdots & X(p_{P-1} + Q)H_e(p_{P-1} + Q) \end{bmatrix}_{P \times 2Q},$$

$$\underline{b}_p = \begin{bmatrix} \tilde{Y}(p_0) - X(p_0)H_e(p_0) \\ \vdots \\ \tilde{Y}(p_{P-1}) - X(p_{P-1})H_e(p_{P-1}) \end{bmatrix}_{P \times 1},$$

and $p_i$ indicates one of the P subcarriers whose transmitted value is known (e.g. pilot subcarriers).

As shown above, matrix $A_p$ may include estimates of X and H for the P subcarriers and also for the Q subcarriers (if any) on either side of each of those P subcarriers. The estimates H for the Q subcarriers may be obtained using an LMS process, interpolation in the frequency domain from estimates for P subcarriers, or any other method disclosed herein. It is expressly contemplated that, as compared to a method used to obtain estimates of H for the P subcarriers, the same or a different method may be used to obtain estimates of H for the neighboring Q subcarriers. As for the estimates X for the Q subcarriers, estimates obtained using one-tap equalization $$\left( X(i) = \frac{\tilde{Y}(i)}{H(i)} \right)$$

may be sufficiently accurate, at least for a first iteration, although any method or methods of estimating X as disclosed herein may be used in a first or subsequent iteration. In further embodiments, more or even all of the subcarriers may be used to obtain the matrix A.

Least-squares solution of a system of the form $A\underline{\Phi}_e = \underline{b}$ may include computation of the pseudoinverse $A^+ = (A^H A)^{-1} A^H$, as neither of the matrices A and $A_p$ is likely to be square. However, such computation may be relatively inexpensive, as the matrix to be inverted $A^H A$ (or $A_p^H A_p$) is relatively small (2Q×2Q), especially in an application where Q is selected to be only 1 or 2.

For subcarriers whose transmitted signal is known, an initial estimate for the equivalent channel response may be obtained by dividing the received signal by the corresponding known transmitted signal, e.g. according to the expression $$\tilde{H}(m) = \frac{\tilde{Y}(m)}{X(m)}.$$

Alternatively, an initial estimate for the equivalent channel response may be obtained from previous symbols by using, for example, a least-mean-squares (LMS) algorithm.

In obtaining an estimate of the phase noise process, it may be desirable to use a channel response estimate that is less noisy than the estimate $\hat{\underline{H}}$. One of skill in the art may note, for example, that using the estimate $\hat{\underline{H}}$ for $\underline{H}_e$ in expression (2.6) will result in a vector $\underline{b}$ whose value is zero.

Task T100 obtains an estimate of a channel response based on at least one received symbol. An implementation T110 of task T100 obtains a filtered channel response estimate $\hat{\underline{H}}$ based on an estimate $\tilde{\underline{H}}$. FIG. 8A shows a block diagram of an implementation 210 of channel estimator 200 that may be used to perform such a task. Channel estimator 210 includes a filter 300 arranged to obtain a filtered estimate $\hat{H}(p)$ from estimate $\tilde{H}(p)$ for a carrier $p \in P$. Such an operation may be performed serially and/or in parallel to obtain filtered estimates for other elements of P. Task T200 may then be configured to use the estimate $\hat{\underline{H}}$ for $\underline{H}_e$ ($\hat{\underline{H}}_e$).

An implementation T120 of task T110 recalculates the channel response estimate by transforming an initial channel response estimate into a different domain, truncating it according to an expected channel impulse response length, and performing an inverse transform on the truncated signal. Such filtering may be especially suitable for a channel whose response varies relatively quickly over time (e.g. from one symbol to the next). In one example, task T120 converts $\tilde{\underline{H}}$ to a time-domain sequence $\underline{\tilde{h}}$ by taking its inverse discrete Fourier transform:

$$\underline{\tilde{h}} = IDFT(\tilde{\underline{H}}) = W^H \tilde{\underline{H}}.$$

Typically, only some of the M values of the transmitted symbol $\underline{X}$ are known a priori (for example, a set P of pilot signals). In such a case, the initial estimate vector $\tilde{\underline{H}}$ may only include elements that correspond to those values of $\underline{X}$, and the transform matrix W may be substituted by a reduced matrix $W_p$ that includes only the columns of W that correspond to those elements.

Applying the inverse transform to $\tilde{\underline{H}}$ produces an M-element vector $\underline{\tilde{h}}$. However, the channel impulse response may be known or assumed to have a length L that is less than M. Thus, it may be assumed that only the first L values of $\underline{\tilde{h}}$ are valid, and that the remaining values are noise. Task T120 truncates $\underline{\tilde{h}}$ (e.g. to length L) and applies a transform of the truncated vector $\underline{\tilde{h}}$ back into the domain of $\tilde{\underline{H}}$ to obtain the channel response estimate $\hat{\underline{H}}$. In one example, the truncation of $\underline{\tilde{h}}$ is performed by applying a reduced transform matrix $W_L$ that includes only the first L columns of W:

$$\hat{\underline{H}} = DFT(IDFT(\tilde{\underline{H}})) = W_L W^H \tilde{\underline{H}}. \quad (2.7)$$

A system or apparatus according to an embodiment may include an implementation of filter 200 configured to perform such an operation. One of skill in the art will understand that the transform matrix (e.g. $W_L W^H$) may be calculated and stored prior to run-time.

Another implementation T130 of task T110 obtains a channel response estimate $\hat{\underline{H}}$ based on information received during one or more previous symbol periods. Such filtering may be especially suitable for a channel whose response varies relatively slowly over time (e.g. less than the random noise from one symbol to the next). FIG. 8B shows a block diagram of an implementation 220 of channel estimator 200. Estimator 220 includes a delay element and a prediction filter 310 that obtains a filtered estimate $\hat{H}_l(p)$ of the channel response during symbol period l for a carrier $p \in P$, where $\hat{H}_l(p)$ is based on one or more estimates $\tilde{H}(p)$ corresponding to symbol periods prior to l (and possibly on the current estimate $\tilde{H}_l(p)$).

Figure 9A:
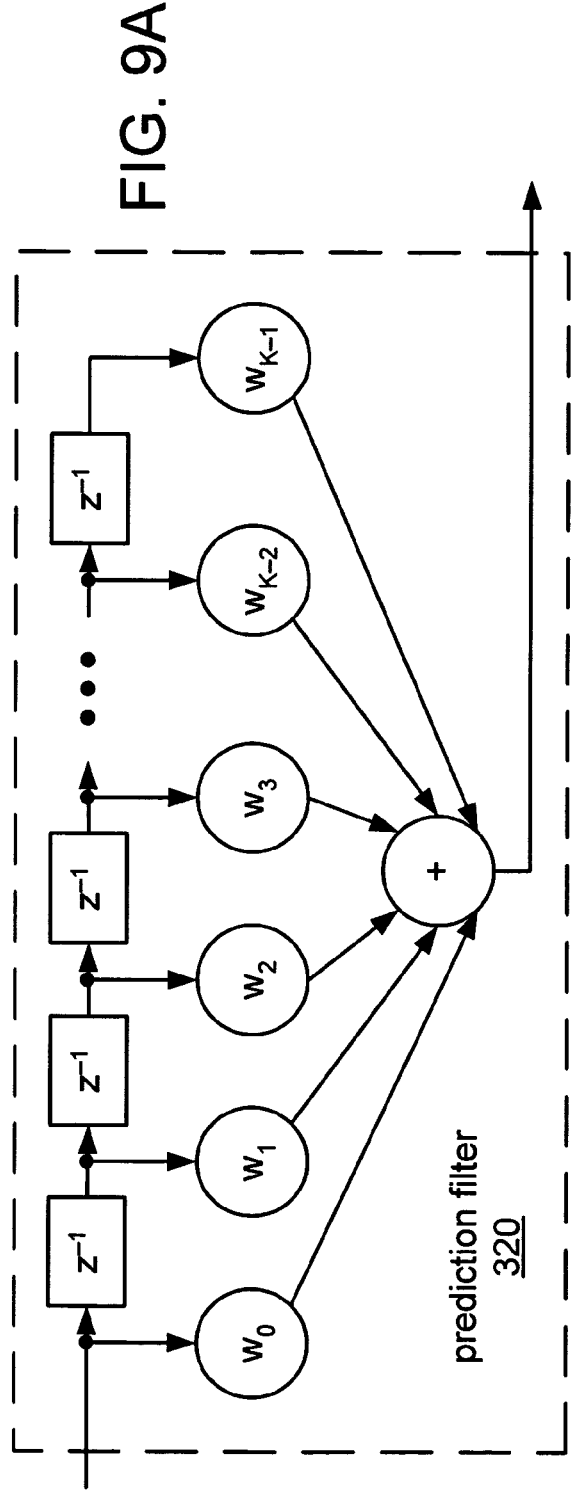
FIG. 9A is a block diagram of an implementation 320 of prediction filter 310.

Task T130 may be configured to perform a linear prediction. For example, task T130 may obtain a channel estimate based on a sum of weighted values from signals received during previous symbol periods. In some instances (such as on a carrier that carries a continuous pilot), the weighted values may correspond to consecutive symbol periods. In other instances (such as on a carrier that carries a scattered pilot), the weighted values may correspond to symbol periods that are not consecutive (for example, every fourth symbol period). FIG. 9A shows an implementation 320 of prediction filter 310 that calculates a sum of K weighted values of signals received during previous symbol periods. The value of K may be fixed or may be selected based on an expected rate of change in the channel response over time. In one example, the value of K is six.

It may be desired for at least some of the filter weights to be adaptive (e.g. updated periodically and/or upon some event, as opposed to being fixed). For example, the value of a weight may be based on a characteristic of one or more current values of $\tilde{H}(p)$ or $\hat{H}(p)$, one or more past values of $\tilde{H}(p)$ or $\hat{H}(p)$, and/or a channel response estimate from another carrier. In some cases, the value of a weight may be based on an error signal, such as a difference between the current estimates $\tilde{H}_l(p)$ and $\hat{H}_l(p)$.

Figure 9B:
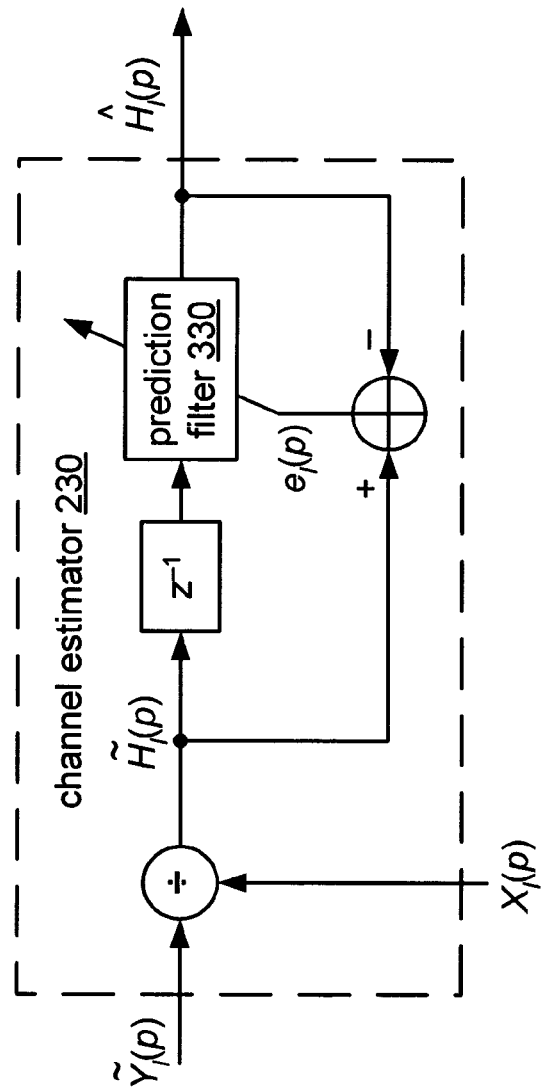
FIG. 9B is a block diagram of an implementation 230 of channel estimator 200.

Task T130 may be configured to update a set of filter weights according to an application of a least mean squares (LMS) or steepest-gradient algorithm, such as the following:

$$W_{l+r}(p)=W_l(p)+\mu e_l(p)[\tilde{H}_l(p)]^*, \quad (2.8)$$

where $W_l(p)$ denotes the vector of weight values $[W_0, W_1, \ldots, W_{M-1}]$ for symbol period l; $[\tilde{H}_l(p)]^*$ denotes the complex conjugate of the corresponding vector of input values to the weights; $e_l(p)$ denotes an error signal with value $\tilde{H}_l(p)-\hat{H}_l(p)$; μ denotes a step size parameter that may be fixed, selected, or adaptive; and r has value 1 for continuous pilot carriers and 4 for scattered pilot carriers. In another example, task T130 may be configured to apply a related method such as a normalized LMS or recursive LMS algorithm. FIG. 9B shows a block diagram of an implementation 230 of channel estimator 200 in which the values of one or more weights in an implementation 330 of prediction filter 320 may be updated based on such an algorithm.

Figure 10A:
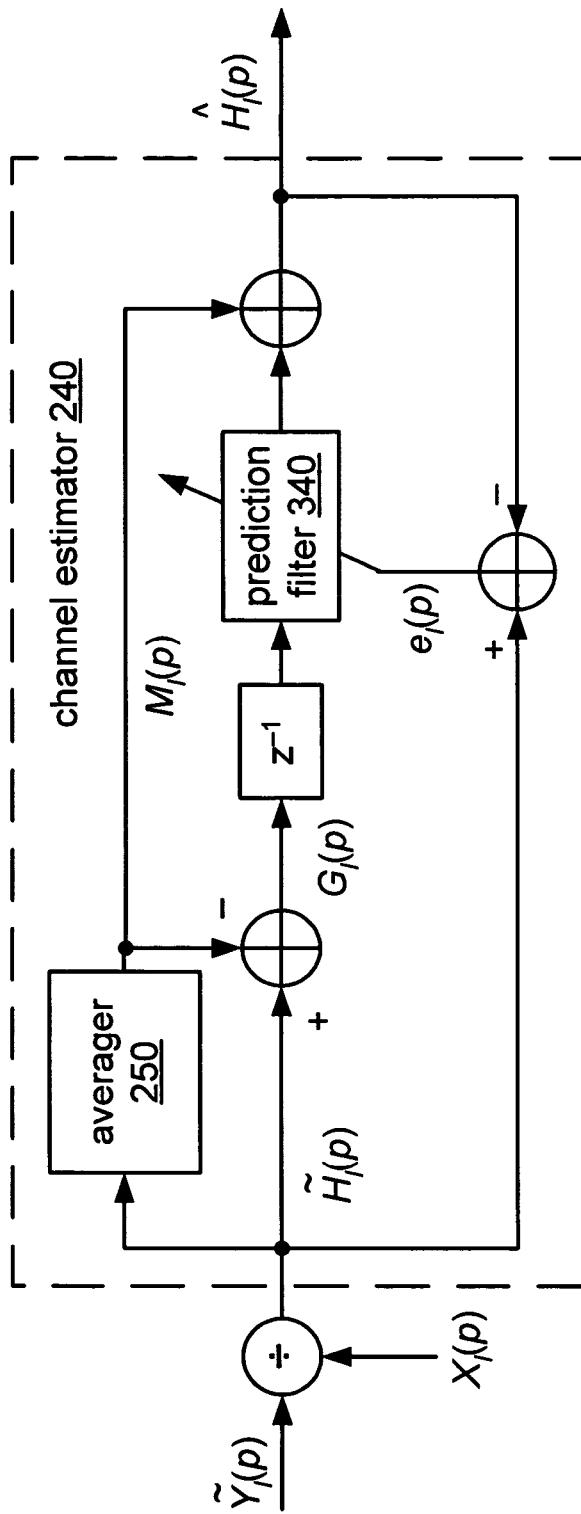
FIG. 10A is a block diagram of an implementation 240 of channel estimator 200.

It may be desirable to concentrate the prediction operation upon a portion of the channel response that changes over time. For example, it may be desirable to predict a distance of the current estimate from a mean estimate. FIG. 10A shows a block diagram of an implementation 240 of channel estimator 200 that includes an averager 250 and an implementation 340 of prediction filter 320. Averager 250 may be implemented as a moving averager having a finite impulse response (FIR) based on two or more noisy estimates. For a scattered pilot carrier, averager 250 may produce a mean value according to the following expression:

$$M_{l+r}(p)=\alpha\tilde{H}_l(p)+(1-\alpha)\tilde{H}_{l-r}(p),$$

where α is a weighting factor (0≦α≦1) that may be fixed, selected, or adaptive. Alternatively, averager 250 may be implemented as a decaying integrator having an infinite impulse response (IIR) based on one or more previous states:

$$M_{l+r}(p)=\beta M_l(p)+(1-\beta)\tilde{H}_l(p),$$

where β is a weighting factor (0≦β≦1) that may be fixed, selected, or adaptive. In one example, the factor β has the value 63/64.

Filter 340 receives a value G that indicates a distance of the current noisy estimate from a mean estimate. In the example of FIG. 10A, the value of $G_l(p)$ is calculated as $\tilde{H}_l(p)-M_l(p)$. For a scattered pilot carrier, the values of the weights of filter 340 may be updated according to the following normalized LMS expression:

$$W_{l+r}(p) = W_l(p) + \frac{\mu e_l(p)[G_l(p)]^*}{|G_l(p)|^2}, \quad (2.9)$$

where $G_l(p)$ denotes the vector $[G_{l-r}, G_{l-2r}, \ldots, G_{l-Mr}]$ of input values to the weights for carrier p and symbol period l, and r has value 1 for continuous pilot carriers and 4 for scattered pilot carriers.

In some applications (for example, in a very noisy environment), it may be preferred to update the values of the weights based on information from other carriers (such as neighboring carriers). Averaging weight value corrections over a set of carriers (or all carriers) may provide a more robust channel response estimate. In one scattered pilot example, the correction values for the scattered pilot (SP) carriers in P are averaged, and the same weight values are used for all such carriers:

$$W_{l+1} = W_l + \mu \sum_{p \in SP(P)} \frac{e_l(p)[G_l(p)]^*}{|G_l(p)|^2}. \quad (2.10)$$

A similar operation may be applied to obtain a common weight value vector for the continuous pilot carriers in P. It should be noted that although the weights for the scattered pilots are updated every symbol period in this example, it may still be desirable to calculate a new filtered estimate for each such carrier only at every fourth symbol period, corresponding to the appearance of a new pilot signal on that carrier. One of skill in the art will understand that task T130 may also be implemented to obtain a channel response estimate $\hat{H}$ based on information received during one or more subsequent symbol periods (whether in addition to, or as an alternative to, the information received during the one or more previous symbol periods).

In an instance where an initial channel response estimate is obtained according to an implementation of task T110, it may be sufficient to calculate an iterated channel estimate in task T350 according to the relation $$\hat{H}^{(1)}(m) = \frac{\tilde{Y}(m)}{\hat{X}(m)}.$$

Task T100 obtains an estimate of a channel response based on at least one received symbol. An implementation of task T100 as described herein may be applied to scattered pilot carriers to obtain channel response estimates for symbol periods during which pilot signals are transmitted. Such a task may also perform interpolation over time to obtain channel estimates for the carrier during symbol periods between the scattered pilot signals.

Figure 10B:
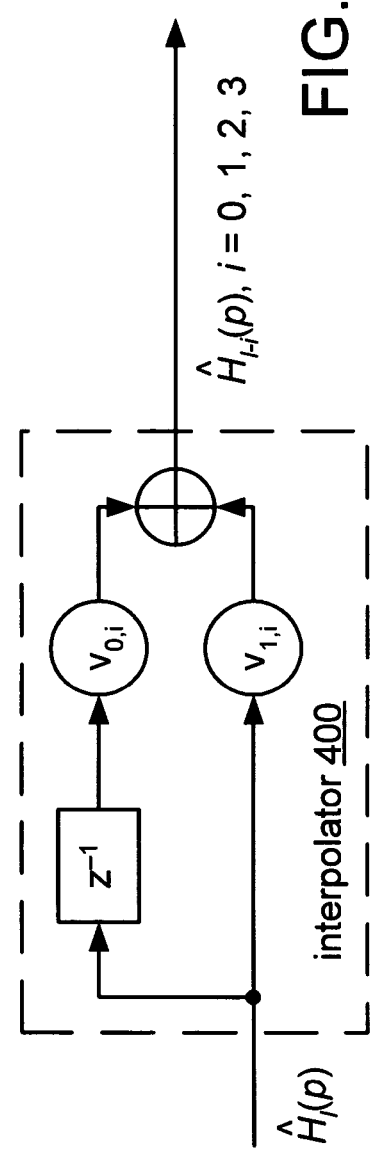
FIG. 10B is a block diagram of an interpolator 400.

FIG. 10B shows a block diagram of an interpolator 400 that calculates channel response estimates for the three symbol periods preceding the period of the current estimate. In this example, the weights ν for this linear interpolator are as follows:

$[v_{0,0}, v_{1,0}]=[0, 1]$;

$[v_{0,1}, v_{1,1}]=[\frac{1}{4}, \frac{3}{4}]$;

$[v_{0,2}, v_{1,2}]=[\frac{1}{2}, \frac{1}{2}]$;

$[v_{0,3}, v_{1,3}]=[\frac{3}{4}, \frac{1}{4}]$.

Other implementations of interpolator 400 may apply a nonlinear function (for example, a higher-order polynomial such as quadratic or cubic, or some other function or statistic) and/or perform an interpolation based on more than two estimates.

An implementation of task T100 may further perform an interpolation along the frequency axis to obtain channel estimates for the data carriers. Possible forms of such interpolation range from linear interpolation between the two closest pilot channel estimates to an FIR or IIR interpolation based on more (possibly all) of the available channel estimates for the symbol period. Interpolation of channel response estimates for intermediate pilot and/or data carriers may also be implemented as a two-dimensional (e.g. surface-fitting) operation in time and frequency.

Task T300 obtains an estimate of a transmitted symbol based on the phase noise process estimate. One implementation T320 of task T300 applies an equalization process to a simplified system model $\underline{\tilde{Y}}=C\underline{X}$, where the matrix C is the estimated equivalent channel matrix including the phase noise process:

$$C(ii) = \hat{H}_e(i), \quad (2.11)$$

$$C(ij) = \begin{cases} \hat{H}_e(j)\hat{\Phi}_e((j-i)\bmod M), & |(j-i)\bmod M| \leq Q \\ 0, & \text{otherwise} \end{cases}$$

for $0 \leq i, j \leq M-1$. The matrix C is a sparse matrix having only (2Q+1) nonzero bands.

An embodiment T325 of task T320 applies a minimum mean-squared error equalization (MMSE) process to solve the system $\underline{\tilde{Y}}=C\underline{X}$ for the transmitted symbol $\underline{X}$. For example, $\underline{X}$ may be evaluated according to the following expression:

$$\underline{X}=(C^H C+\sigma^2 I)^{-1}C^H\underline{\tilde{Y}}, \quad (2.12)$$

where $\sigma^2$ is the covariance of the random noise process $\underline{N}$.

An MMSE process is typically robust to error in $\sigma^2$. The expression $\underline{N}=\underline{Y}-H\underline{X}$ may be derived from the system model $\underline{Y}=H\underline{X}+\underline{N}$. Following from this expression, in one example $\sigma^2$ is calculated as the average square of the vector $\underline{b}$:

$$\sigma^2 = \frac{1}{M}\sum_{i=0}^{M-1}\left|\tilde{Y}(i)-\hat{H}_e(i)X(i)\right|^2. \quad (2.13)$$

In a case where transmitted values X are known for a set P of the subcarriers, $\sigma^2$ may be calculated according to the following expression:

$$\sigma^2 = \frac{1}{N_P}\sum_{p\in P}\left|\tilde{Y}(p)-\hat{H}_e(p)X(p)\right|^2,$$

where $N_P$ is the number of subcarriers in set P.

It may be desirable to implement MMSE equalization according to expression (2.12) without inverting the M×M matrix $(C^H C+\sigma^2 I)$. An embodiment T325A of task T325 applies an alternate MMSE process, in which the matrix inversion of expression (2.12) is replaced with a Taylor series expansion:

$$(C^H C+\sigma^2 I)^{-1} = \Lambda^{-1}\sum_{k=0}^{\infty}(-1)^k[(C^H C+\sigma^2 I)\Lambda^{-1}-I]^k, \quad (2.14)$$

where $\Lambda=\text{diag}(C^H C+\sigma^2 I)$.

In implementing task T325A, the designer may select the number of expansion terms k according to a desired balance between performance and complexity. For example, some implementations use a first-order approximation which may be calculated easily:

$$(C^H C+\sigma^2 I)^{-1}=2\Lambda^{-1}-\Lambda^{-1}(C^H C+\sigma^2 I)\Lambda^{-1}, \quad (2.15)$$

In such a case, the estimate for the transmitted symbol vector may be expressed as $$\underline{X}=[2\Lambda^{-1}-\Lambda^{-1}(C^H C+\sigma^2 I)\Lambda^{-1}]C^H\underline{\tilde{Y}}. \quad (2.16)$$

As the matrix C is band-limited, the remaining matrix multiplication in expression (2.16) may be performed relatively cheaply. Selection of the number of expansion terms may also be performed automatically and/or dynamically based on one or more system parameters.

An alternative implementation T330 of task T300 performs an equalization by subtracting estimated intercarrier interference from the received signal. For example, task T330 may be configured to subtract the effects of nearby subcarriers from the received signal and normalize the result by the equivalent channel response for the current subcarrier, as in the following expression:

$$\hat{X}(m) = \frac{\tilde{Y}(m)-\sum_{q=-Q,q\neq 0}^{Q}X(m+q)\hat{H}_e(m+q)\hat{\Phi}_e(q)}{\hat{H}_e(m)}. \quad (2.17)$$

Such an operation is computationally relatively inexpensive and may be iterated one or more times with an updated estimate of the channel response and/or phase noise process.

Once the estimates for the transmitted signals have been obtained, a decision operation may be executed to select the best constellation point (for example, according to a minimum distance criterion) for each element of the estimated transmitted symbol (e.g. according to the modulation scheme used on that subcarrier).

As shown in FIG. 6, a method M110 includes a task T250 that obtains an iterated channel response estimate based on an estimate of the phase noise process as obtained in task T200. For example, task T250 may use the phase noise estimates to obtain new estimates of the equivalent channel responses at pilot subcarriers or at pilot and data subcarriers. In one implementation, a new estimate is calculated according to the following expression:

$$\hat{H}_e^{(1)}(m) = \frac{\tilde{Y}(m)-\sum_{q=-Q,q\neq 0}^{Q}X(m+q)\hat{H}_e^{(0)}(m+q)\hat{\Phi}_e(q)}{X(m)}. \quad (2.18)$$

Such an operation is computationally relatively inexpensive and may be iterated one or more times with an updated estimate of the phase noise process.

As shown in FIG. 7, a method M120 includes a task T350 that obtains an iterated channel response estimate based on estimated transmitted values $\hat{X}$ as obtained in task T300. In one implementation, a new estimate is calculated according to the following expression:

$$\hat{H}_e^{(1)}(m) = \frac{\tilde{Y}(m)-\sum_{q=-Q,q\neq 0}^{Q}\hat{X}(m+q)\hat{H}_e^{(0)}(m+q)\hat{\Phi}_e(q)}{\hat{X}(m)}. \quad (2.19)$$

Such an operation is computationally relatively inexpensive and may be iterated one or more times with an updated estimate of the transmitted signal and/or phase noise process. Another implementation of task T350 obtains an iterated channel response estimate based on estimated transmitted values X̃ as obtained by performing decoding and subsequent re-encoding operations (for example, error detection, error correction, and/or redundancy coding operations, such as encoding, puncturing, and/or interleaving) on received values Y.

Further embodiments include systems, methods, and apparatus in which one or more tasks and/or elements are activated or deactivated (e.g. task T250, task T350) based on a detected Doppler frequency of a received signal, and/or in which the complexity of one or more tasks or elements is varied based on a detected Doppler frequency of a received signal. For example, in implementing task T100, T250, and/or T350, such an embodiment may select between a channel estimate Ĥ and a channel estimate Ĥ as described herein. Such an embodiment may activate or deactivate a phase noise estimation task T200 based on the detected Doppler frequency. In at least some implementations, such selection may offer advantages of power conservation, which is typically an important concern in battery-operated (e.g. handheld) and heat-transfer-restricted applications.

One or more of the elements of apparatus 100 may be implemented as an array of logic elements such as transistors and/or gates. The elements may be implemented together in one chip or across more than one chip. A chip including one or more such elements may also include arrays configured to perform other processing functions on the received signal such as Viterbi decoding, Reed-Solomon forward error correction, etc.

The foregoing presentation of the described embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. Thus, the present invention is not intended to be limited to the embodiments shown above but rather is to be accorded the widest scope consistent with the principles and novel features disclosed in any fashion herein.

What is claimed is:

1. A method of signal processing, said method comprising:
    estimating a plurality of components of a response of a transmission channel during a symbol period;
    based on said estimated components of a response of the transmission channel, estimating a plurality of components of a model of a phase noise process during the symbol period; and
    based on said plurality of estimated components of a model of a phase noise process, estimating a plurality of values of a symbol received during the symbol period,
    wherein each of said plurality of estimated components of a response of a transmission channel corresponds to a different one of a plurality of subcarriers, and
    wherein each of said plurality of estimated values of a symbol corresponds to a different one of said plurality of subcarriers, and
    wherein each of said plurality of estimated values of a symbol is based on at least one product of (A) one among said plurality of estimated components of a response of a transmission channel that corresponds to a neighboring one among the plurality of subcarriers and (B) one of said plurality of estimated components of a phase noise process.

2. The method of signal processing according to claim 1, wherein said estimating a plurality of components of a response of a transmission channel is based on components of an estimated response of the transmission channel during a symbol period prior to the symbol period.

3. The method of signal processing according to claim 1, wherein said estimating a plurality of components of a response of a transmission channel is based on a plurality of weighted values,
    wherein the plurality of weighted values includes values based on estimated components of responses of the transmission channel during symbol periods prior to the symbol period.

4. The method of signal processing according to claim 1, wherein said estimating a plurality of components of a response of a transmission channel is based on differences between (A) components of an estimated response of the transmission channel during a symbol period prior to the symbol period and (B) corresponding components of a mean estimated response of the transmission channel.

5. The method of signal processing according to claim 1, wherein said estimating a plurality of components of a response of a transmission channel is based on differences between corresponding components of two estimates of a response of the transmission channel during a symbol period prior to the symbol period.

6. The method of signal processing according to claim 1, wherein said estimating a plurality of components of a response of a transmission channel comprises:
    obtaining a vector of components of an estimated response of the transmission channel in a frequency domain;
    transforming the vector of components of an estimated response into a time-domain vector; and
    transforming a selected portion of the time-domain vector to obtain a second vector of components of an estimated response of the transmission channel in the frequency domain,
    wherein the selected portion contains fewer than all of the components of the time-domain vector.

7. The method of signal processing according to claim 1, wherein said estimating a plurality of components of a response of a transmission channel during a symbol period comprises, for each of at least some of the plurality of subcarriers, estimating the corresponding component of a response of the transmission channel during the symbol period based on a pilot signal received at the subcarrier.

8. The method of signal processing according to claim 1, said method comprising, based on said plurality of estimated components of a response of a transmission channel, estimating a response of the transmission channel during the symbol period at a second plurality of subcarriers different than the plurality of subcarriers,
    wherein said estimating a plurality of values of a symbol received during the symbol period is based on a result of said estimating a response of the transmission channel during the symbol period at a second plurality of subcarriers.

9. The method of signal processing according to claim 1, wherein said estimating a plurality of values of a symbol received during the symbol period includes subtracting, from a signal received at one of the plurality of subcarriers, an estimate of interference from at least another one of the plurality of subcarriers, wherein the estimate of interference is based on a result of said estimating a plurality of components of a model of a phase noise process.

10. The method of signal processing according to claim 1, wherein said estimating a plurality of values of a symbol received during the symbol period includes applying an equalization matrix to a symbol received during the symbol period, wherein the equalization matrix is based on said plurality of estimated components of a response of a transmission channel and on the plurality of estimated components of a model of a phase noise process.

11. The method of signal processing according to claim 1, wherein said estimating a plurality of values of a symbol received during the symbol period includes performing a minimum mean-squared error equalization operation.

12. The method of signal processing according to claim 1, said method comprising, based on the plurality of components of a model of a phase noise process, reestimating a response of the transmission channel during the symbol period, wherein said estimating a plurality of values of a symbol is based on a result of said reestimating a response of the transmission channel.

13. The method of signal processing according to claim 1, said method comprising:

based on a result of said estimating a plurality of values of a symbol received during the symbol period, reestimating a response of the transmission channel during the symbol period; and based on a result of said reestimating a response of the transmission channel during the symbol period, reestimating said plurality of values of a symbol received during the symbol period.

14. The method of signal processing according to claim 1, wherein the number of the plurality of values is greater than one thousand.

15. The method of signal processing according to claim 1, wherein each of the plurality of values corresponds to a subcarrier of an orthogonal frequency-division-multiplexed system.

16. A method of signal processing, said method comprising processing a received video signal according to the method of claim 1.

17. The method of signal processing according to claim 1, wherein each of said plurality of estimated values of a symbol is based on said plurality of estimated components of a phase noise process.

18. The method of signal processing according to claim 1, wherein each of said plurality of estimated values of a symbol is based on an estimated value of the symbol that corresponds to a neighboring one among the plurality of subcarriers.

19. The method of signal processing according to claim 1, wherein said estimating a plurality of components of a model of a phase noise process includes, based on a detected Doppler frequency of the received signal, selecting between (A) said plurality of estimated components of a response of a transmission channel and (B) a second plurality of estimated components of a response of the transmission channel during the symbol period.

20. The method of signal processing according to claim 1, wherein each of said plurality of estimated values of a symbol is based on (A) a plurality of said estimated components of a response of a transmission channel and (B) a plurality of said estimated components of a model of a phase noise process.

21. The method of signal processing according to claim 1, wherein the model of a phase noise process includes a coefficient vector and a matrix of basis functions, and wherein said estimating a plurality of components of a model of a phase noise process comprises estimating a plurality of components of the coefficient vector.

22. The method of signal processing according to claim 1, wherein said method includes downconverting a received signal to obtain a downconverted signal, and wherein said estimating a plurality of components of a response of a transmission channel is based on the downconverted signal, and wherein the model of a phase noise process is a model of a phase noise process that occurs within said downconverting.

23. A signal processing apparatus, said apparatus comprising:

means for estimating a plurality of components of a response of a transmission channel during a symbol period;

means for estimating, based on said estimated components of a response of the transmission channel, a plurality of components of a model of a phase noise process during the symbol period; and means for estimating, based on said plurality of estimated components of a model of a phase noise process, a plurality of values of a symbol received during the symbol period, wherein each of said plurality of estimated components of a response of a transmission channel corresponds to a different one of a plurality of subcarriers, and wherein each of said plurality of estimated values of a symbol corresponds to a different one of said plurality of subcarriers, and wherein each of said plurality of estimated values of a symbol is based on at least one product of (A) one among said plurality of estimated components of a response of a transmission channel that corresponds to a neighboring one among the plurality of subcarriers and (B) one of said plurality of estimated components of a phase noise process.

24. The signal processing apparatus according to claim 23, wherein said means for estimating a plurality of components of a response of a transmission channel is configured to transform a frequency-domain vector of components of an estimated response of the transmission channel into a time-domain vector and to transform a selected portion of the time-domain vector to obtain a second frequency-domain vector of components of an estimated response of the transmission channel, wherein the selected portion contains fewer than all of the components of the time-domain vector.

25. The signal processing apparatus according to claim 23, wherein said means for estimating a plurality of components of a response of a transmission channel is configured to estimate the plurality of components of a response of the transmission channel based on a plurality of weighted values, wherein the plurality of weighted values includes values based on estimated components of responses of the transmission channel during symbol periods prior to the symbol period.

26. The signal processing apparatus according to claim 23, wherein said means for estimating a plurality of values of a symbol received during the symbol period is configured to subtract, from a signal received at one of the plurality of subcarriers, an estimate of interference from at least another one of the plurality of subcarriers, wherein the estimate of interference is based on the plurality of estimated components of a model of a phase noise process.

27. The signal processing apparatus according to claim 23, wherein each of said plurality of estimated values of a symbol is based on said plurality of said estimated components of a phase noise process.

28. The signal processing apparatus according to claim 23, wherein each of said plurality of estimated values of a symbol is based on an estimated value of the symbol that corresponds to a neighboring one among the plurality of subcarriers.

29. The signal processing apparatus according to claim 23, wherein said means for estimating a plurality of components of a model of a phase noise process is configured to be activated based on a detected Doppler frequency of a received signal.

30. The signal processing apparatus according to claim 23, wherein each of said plurality of estimated values of a symbol is based on (A) a plurality of said estimated components of a response of a transmission channel and (B) a plurality of said estimated components of a model of a phase noise process.

31. The signal processing apparatus according to claim 23, wherein said means for estimating is configured to estimate the plurality of components of a response of a transmission channel based on a signal produced by a tuner, and
    wherein the model of a phase noise process is a model of a phase noise process of the tuner.

32. A signal processing apparatus, said apparatus comprising:
    a channel estimator configured to estimate a plurality of components of a response of a transmission channel during a symbol period;
    a phase noise estimator configured to estimate, based on the estimated components of a response of the transmission channel, a plurality of components of a model of a phase noise process during the symbol period; and
    an equalizer configured to estimate, based on the plurality of estimated components of a model of a phase noise process, a plurality of values of a symbol received during the symbol period,
    wherein each of said plurality of estimated components of a response of a transmission channel corresponds to a different one of a plurality of subcarriers, and
    wherein each of said plurality of estimated values of a symbol corresponds to a different one of said plurality of subcarriers, and
    wherein each of said plurality of estimated values of a symbol is based on at least one product of (A) one among said plurality of estimated components of a response of a transmission channel that corresponds to a neighboring one among the plurality of subcarriers and (B) one of said plurality of estimated components of a phase noise process.

33. The signal processing apparatus according to claim 32, wherein said channel estimator is configured to estimate the plurality of components of a response of the transmission channel based on components of an estimated response of the transmission channel during a symbol period prior to the symbol period.

34. The signal processing apparatus according to claim 32, wherein said channel estimator is configured to estimate the plurality of components of a response of the transmission channel based on a plurality of weighted values,
    wherein the plurality of weighted values includes values based on estimated components of responses of the transmission channel during symbol periods prior to the symbol period.

35. The signal processing apparatus according to claim 32, wherein said channel estimator is configured to obtain the plurality of estimated components of a response of the transmission channel as a vector of components of an estimated response of the transmission channel in a frequency domain, to perform a transform of the vector of components of an estimated response into a time domain, and to perform a transform of a portion of the time-domain vector to obtain a second vector of components of an estimated response of the transmission channel in the frequency domain,
    wherein the portion contains fewer than all of the components of the time-domain vector.

36. The signal processing apparatus according to claim 32, said apparatus comprising an interpolator configured to estimate, based on the plurality of estimated components of a response of the transmission channel during the symbol period, a response of the transmission channel during the symbol period at a second plurality of subcarriers different than the plurality of subcarriers,
    wherein said equalizer is configured to estimate the plurality of values of a symbol received during the symbol period based on the estimated response of the transmission channel during the symbol period at the second plurality of subcarriers.

37. The signal processing apparatus according to claim 32, wherein said equalizer is configured to subtract, from a signal received at one of the plurality of subcarriers, an estimate of interference from at least another one of the plurality of subcarriers,
    wherein the estimate of interference is based on the plurality of estimated components of a model of a phase noise process.

38. The signal processing apparatus according to claim 32, wherein each of said plurality of estimated values of a symbol is based on said plurality of said estimated components of a phase noise process.

39. The signal processing apparatus according to claim 32, wherein each of said plurality of estimated values of a symbol is based on an estimated value of the symbol that corresponds to a neighboring one among the plurality of subcarriers.

40. The signal processing apparatus according to claim 32, wherein each of said plurality of estimated values of a symbol is based on (A) a plurality of said estimated components of a response of a transmission channel and (B) a plurality of said estimated components of a model of a phase noise process.

41. The signal processing apparatus according to claim 32, wherein said channel estimator is configured to estimate the plurality of components of a response of a transmission channel based on a signal produced by a tuner, and
    wherein the model of a phase noise process is a model of a phase noise process of the tuner.

42. A data storage medium having machine-readable instructions that when executed by an array of logic elements cause the array to perform a method of signal processing comprising:
    estimating a plurality of components of a response of a transmission channel during a symbol period;
    based on said estimated components of a response of the transmission channel, estimating a plurality of components of a model of a phase noise process during the symbol period; and
    based on said plurality of estimated components of a model of a phase noise process, estimating a plurality of values of a symbol received during the symbol period,
    wherein each of said plurality of estimated components of a response of a transmission channel corresponds to a different one of a plurality of subcarriers, and wherein each of said plurality of estimated values of a symbol corresponds to a different one of said plurality of subcarriers, and wherein each of said plurality of estimated values of a symbol is based on at least one product of (A) one among said plurality of estimated components of a response of a transmission channel that corresponds to a neighboring one among the plurality of subcarriers and (B) one of said plurality of estimated components of a phase noise process.

* * * * *

UNITED STATES PATENT AND TRADEMARK OFFICE
CERTIFICATE OF CORRECTION

PATENT NO. : 7,668,269 B2
APPLICATION NO. : 11/124131
DATED : February 23, 2010
INVENTOR(S) : Ma et al.

It is certified that error appears in the above-identified patent and that said Letters Patent is hereby corrected as shown below:

col. 6, l. 3: change "H" to --<u>H</u>--;

col. 6, l. 10: change " $\tilde{y}(i) = e^{j\phi(i)} \sum_{l=0}^{L-1} h_l x(i-l) + n(i), 0 \leq i \leq M-1,$ " to -- $$\tilde{y}(i) = e^{j\phi(i)} \sum_{l=0}^{L-1} h_l x(i-l) + n(i), \quad 0 \leq i \leq M-1,$$ --;

col. 1, l. 27: change "Φ*B<u>α</u>" to -- <u>Φ</u>* = B<u>α</u> --;

col. 15, l. 41: change " $\sigma^2 = \frac{1}{M} \sum_{i=0}^{M-1} |\hat{Y}(i) - \hat{H}_e(i)X(i)|^2.$ " to -- $$\sigma^2 = \frac{1}{M} \sum_{i=0}^{M-1} |\tilde{Y}(i) - \hat{H}_e(i)X(i)|^2.$$ --.

Signed and Sealed this

Eleventh Day of May, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,668,269 B2 | Page 1 of 1 |
| APPLICATION NO. | : 11/124131 | |
| DATED | : February 23, 2010 | |
| INVENTOR(S) | : Ma et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1325 days.

Signed and Sealed this

Twenty-eighth Day of December, 2010

David J. Kappos
*Director of the United States Patent and Trademark Office*